(12) United States Patent
Crutchfield, Jr. et al.

(10) Patent No.: US 7,676,403 B2
(45) Date of Patent: Mar. 9, 2010

(54) SYSTEM AND METHOD OF IMAGE CAPTURE SIMULATION

(75) Inventors: William G. Crutchfield, Jr., Charlottesville, VA (US); Marty Johnson, Blacksburg, VA (US); Richard Innes Wright, Blacksburg, VA (US); James P. Carneal, Blacksburg, VA (US)

(73) Assignee: Crutchfield Corporation, Charlottesville, VA (US)

( * ) Notice: Subject to any disclaimer, the term of this patent is extended or adjusted under 35 U.S.C. 154(b) by 1342 days.

(21) Appl. No.: 11/123,247

(22) Filed: May 6, 2005

(65) Prior Publication Data

US 2006/0250503 A1 Nov. 9, 2006

Related U.S. Application Data

(63) Continuation-in-part of application No. 11/053,931, filed on Feb. 10, 2005, now abandoned, and a continuation-in-part of application No. 10/147,476, filed on May 16, 2002, now Pat. No. 7,096,169.

(51) Int. Cl.
G06F 17/30 (2006.01)
G06F 9/44 (2006.01)
G06Q 30/00 (2006.01)
G09B 25/00 (2006.01)

(52) U.S. Cl. .......................... 705/27; 705/500; 703/21; 434/367

(58) Field of Classification Search .................. 705/26, 705/27, 500; 703/21; 434/367; 345/581
See application file for complete search history.

(56) References Cited

U.S. PATENT DOCUMENTS

| 4,631,691 A | 12/1986 | Pica |
| 5,880,974 A * | 3/1999 | Tarumi et al. .................. 703/21 |
| 7,412,034 B2 * | 8/2008 | Rancu et al. .................... 379/9 |
| 2006/0072709 A1 * | 4/2006 | Rancu et al. ............... 379/9.01 |
| 2006/0197771 A1 * | 9/2006 | Tang et al. ................... 345/581 |

FOREIGN PATENT DOCUMENTS

JP 2002269159 A * 9/2002

OTHER PUBLICATIONS

Porikli, Fatih, "Inter-Camera Color Calibration by Correlation Model Function," MERL—A Mitsubishi Electric Research Laboratory, TR-2003-103, Feb. 2004.*
Millman, H., "Digital Cameras," Computerworld, p. 72, Aug. 11, 1997.*
Morgenstern, S., "Digital Camera Match Game," Home Office Computing, vol. 17, No. 5, p. 92, May 1999.*

(Continued)

Primary Examiner—Nicholas D Rosen
(74) Attorney, Agent, or Firm—Goodwin Procter LLP

(57) ABSTRACT

Systems and methods for demonstrating displays and image capture devices are presented. Such systems and methods are typically provided in a retail environment. Customers may efficiently and easily compare disparate displays and image capture devices at a single location using the systems and methods disclosed herein.

33 Claims, 21 Drawing Sheets

OTHER PUBLICATIONS

Anon., "Agfa Monotype Announces Two End-User Color Applications for Printer OEMs," Business Wire, Oct. 11, 1001.*

Chamberlin et al., Colour Its Measurement, Computation and Application; Heyden & Son Ltd., 1980.

D.L. MacAdam., Color Measurement Theme and Variations; Springer-Verlag Berlin Heidelberg New York 1981.

James C. King, Why Color Measurement?; Adobe Systems Incorporated Abstract.

Faith Porikli, Inter-Camera Color Calibration by Correlation Model Function; MERL—A Mitsubishi Electric Research Laboratory, TR-2003-103, Feb. 2004.

F. Porikli, Sensitivity Characteristics of Cross-Correlation Distance Metric and Model Function; 2003 Conference on Information Sciences and Systems, The Johns Hopkins University, Mar. 12-14, 2003.

Steven W. Smith, The Scientist and Engineer's Guide to Digital Signal Processing; Second Edition, California Technical Publishing San Diego, California.

Fatih Porikli, Inter-Camera Color Calibration by Correlation Model Function; MERL—A Mitsubishi Electric Research Laboratory, TR-2003-103, Feb. 2004.

* cited by examiner

SYSTEM AND METHOD OF IMAGE CAPTURE SIMULATION

CROSS-REFERENCE TO RELATED APPLICATIONS

This present application is a continuation-in-part of and claims priority to U.S. patent application Ser. No. 10/147,476 filed May 16, 2002 now U.S. Pat. No. 7,096,169, to Crutchfield entitled "Virtual Speaker Demonstration System and Virtual Noise Simulation," and to U.S. patent application Ser. No. 11/053,931 filed Feb. 10, 2005 now abandoned to Crutchfield entitled "Virtual Showroom For Interactive Electronic Shopping," the disclosures of which are expressly incorporated by reference herein in their entireties.

FIELD OF THE INVENTION

The present invention relates generally to a system and method for image capture simulation in a retail environment. In particular, certain embodiments of the invention relate to providing consumers with the ability to compare various image capture devices.

BACKGROUND OF THE INVENTION

Traditional retail electronics showrooms do not allow consumers to efficiently compare products. For example, a typical showroom might feature several different cameras and camcorders, without any efficient way to for a consumer to compare the various models. Further, traditional product comparison methods require retailers to provide demonstration models for each product of comparison. This takes up valuable retail space and degrades the value of the demonstration models, which are typically sold to customers at a discount.

SUMMARY OF THE INVENTION

According to an embodiment of the present invention, a system for evaluating characteristics of multiple image capture devices in a retail environment is presented. The system includes a first image capture device accessible to a customer. The system also includes a user interface configured to accept a user input. The system further includes a stored collection of parameters associated with a plurality of image capture devices. The system further includes a purchase point so that at least one of the plurality of image capture devices may be purchased. The system further includes a processor configured to access at least one of the stored parameters in response to the user input. The first image capture device is configured to simulate at least one of the plurality of image capture devices consistent with the user input.

Various optional features of the above embodiment include the following. The system may further include a display configured to display an image captured by the first image capture device in accordance with the simulation of the at least one of the plurality of image capture devices. The display may be a television screen, computer monitor, organic display, digital paper, flexible display, foldable display, roll-up display, glasses, goggles, helmet, active windows, active picture frame, head-up display, embedded display, or printer. The first image capture device may be a camera, camcorder, scanner, fax machine, copy machine, biological imaging device, or mimeograph. The at least one of the plurality of image capture devices may be a camera, camcorder, scanner, fax machine, copy machine, biological imaging device, or mimeograph. The stored collection of parameters may include parameters relating to resolution, and the first image capture device may be configured to simulate a resolution of at least one of the plurality of image capture devices. The stored collection of parameters may include parameters relating to color, and the first image capture device may be configured to simulate a color captured by at least one of the plurality of image capture devices. The system may be further configured to alter a color histogram. The system may further include color profile means. At least one of the stored parameters may be empirically determined. The collection of stored parameters may include: height, width, resolution, contrast ratio, brightness, color range, aspect ratio, pixel size, pixel shape, pixel composition, pixel orientation, field of view, user interface, interactivity, spatial density, bandwidth, connectivity, or input type.

According to an embodiment of the present invention, a method of simulating a plurality of image capture devices for evaluation in a retail environment is presented. The method includes providing a first image capture device. The method also includes accepting an input at a user interface. The method further includes accessing, from a stored collection of parameters associated with a plurality of image capture devices, a stored parameter associated with a second image capture device. The method further includes simulating the second image capture device using the first image capture device and consistent with the user input. The method further includes offering at least one of the plurality of image capture devices for sale.

Various optional features of the above embodiment include the following. The method may further include displaying an image captured by the first image capture device in accordance with the step of simulating. The step of displaying may include displaying on a television screen, computer monitor, organic display, digital paper, flexible display, foldable display, roll-up display, glasses, goggles, helmet, active windows, active picture frame, head-up display, embedded display, or printer. The first image capture device may be a camera, camcorder, scanner, fax machine, copy machine, biological imaging device, or mimeograph. At least one of the plurality of image capture devices may be a camera, camcorder, scanner, fax machine, copy machine, biological imaging device, or mimeograph. The stored collection of parameters may include parameters relating to resolution, and the step of simulating may include simulating a resolution of at least one of the plurality of image capture devices. The stored collection of parameters may include parameters relating to color, and the step of simulating may include simulating a color captured by at least one of the plurality of image capture devices. The method may further include altering a color histogram. The method may further include using color profiles. The method may further include empirically determining at least one of the stored parameters. The collection of stored parameters may include height, width, resolution, contrast ratio, brightness, color range, aspect ratio, pixel size, pixel shape, pixel composition, pixel orientation, field of view, user interface, interactivity, spatial density, bandwidth, connectivity, or input type.

According to an embodiment of the present invention, a system for evaluating characteristics of multiple image capture devices in a retail environment is presented. The system includes at least one image capture device accessible to a customer. The system also includes a user interface configured to accept a user input. The system further includes a stored collection of parameters associated with a plurality of image capture devices. The system further includes means for simulating at least one of the plurality of image capture devices in response to the user input. The system further includes means for offering at least one of the plurality of image capture devices for sale. The means for simulating is configured to access at least one of the stored parameters consistent with the user input.

Various optional features of the above embodiment include the following. The system may further include means for displaying an image captured by the first image capture device in accordance with the simulation of the at least one of the plurality of image capture devices. The means for displaying may be a television screen, computer monitor, organic display, digital paper, flexible display, foldable display, roll-up display, glasses, goggles, helmet, active windows, active picture frame, embedded display, head-up display, or printer. The first image capture device may be a camera, camcorder, scanner, fax machine, copy machine, biological imaging device, or mimeograph. At least one of the plurality of image capture devices may be a camera, camcorder, scanner, fax machine, copy machine, biological imaging device, or mimeograph. The system may further include means for simulating a resolution of at least one of the plurality of image capture devices, where the stored collection of parameters includes parameters relating to resolution. The system may further include means for simulating a color captured by at least one of the plurality of image capture devices, where the stored collection of parameters includes parameters relating to color. The means for simulating a color may include means for altering a color histogram. The means for simulating a color may include color profile means. At least one of the stored parameters may be empirically determined. The collection of stored parameters may include: height, width, resolution, contrast ratio, brightness, color range, aspect ratio, pixel size, pixel shape, pixel composition, pixel orientation, field of view, user interface, interactivity, spatial density, bandwidth, connectivity, or input type.

Still further features and advantages of the present invention are identified in the ensuing description, with reference to the drawings identified below.

BRIEF DESCRIPTION OF THE DRAWINGS

The purpose and advantages of the present invention will be apparent to those of skill in the art from the following detailed description in conjunction with the appended drawings.

DETAILED DESCRIPTION OF THE INVENTION

Figure 1:
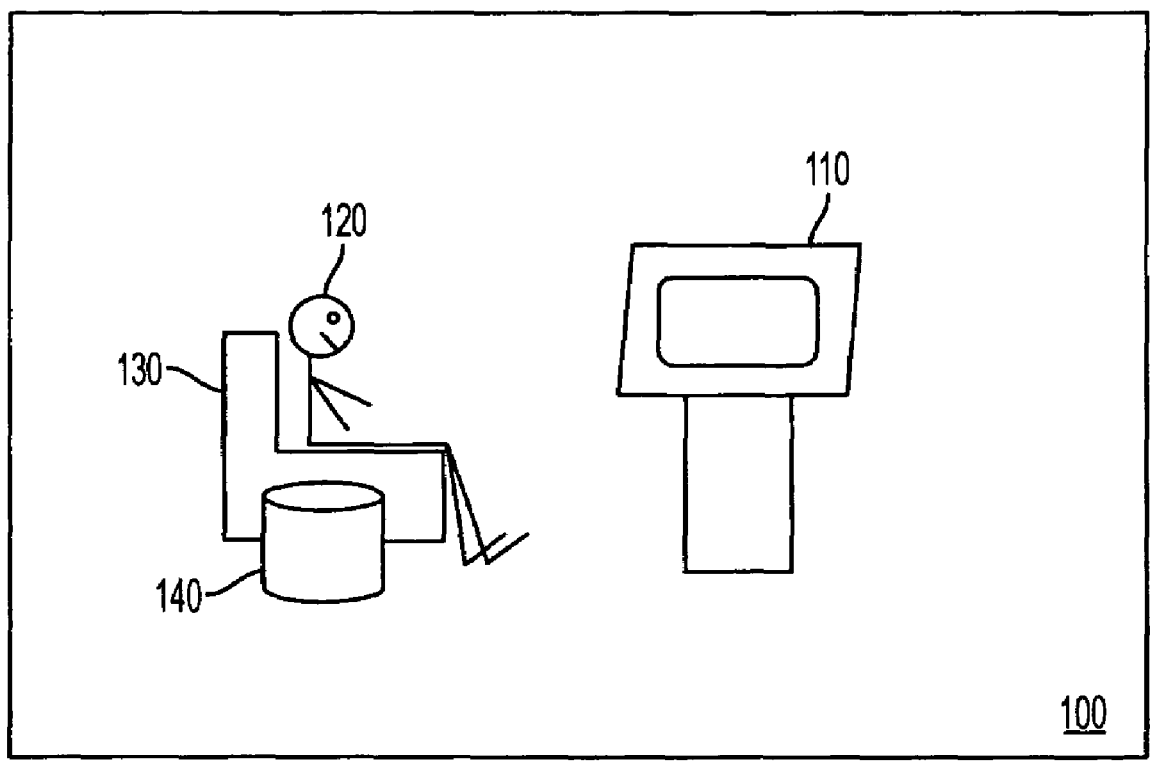
FIG. 1 is a schematic diagram of certain features of an embodiment of the present invention.

FIG. 1 is a schematic diagram of certain features of an embodiment of the present invention. This embodiment includes a product demonstration area 100 situated in a retail environment. The retail environment may be part of a brick-and-mortar store that caters to consumers. Access to the retail environment may require a membership, or walk-in consumers may be allowed. In general, the retail environment is part of a store that sells electronic equipment to consumers.

The embodiment of FIG. 1 includes a display 110 that is capable of simulating a multiplicity of different displays. In general, a display used to create a simulation is referred to as a "reference" display, and a display that is being simulated is referred to as a "target" display. For example, display 110 may simulate individual brands and models of target displays. Thus, for example, reference display 110 may be capable of simulating a SAMSUNG LTP1745, a SHARP AQUOS LC-13S1US, and a TOSHIBA 14DL74.

Display 110 is preferably located in a product demonstration area 100 that is acoustically and visually isolated from sound and light sources that would interfere with a careful evaluation of its simulations. By way of non-limiting example, display 110 is located in a dedicated room with lighting having a dimmer control and possibly a window. Such a room may be free-standing or a different room in the store, but is preferably environmentally isolated from the rest of the store. The environment is preferably controlled in terms of ambient light and sound. Preferably, the dedicated room includes dark-colored walls and acoustic damping material. The acoustics are preferably as dead (anechoic) as possible; reverberation (e.g., acoustic reflections due to hardwood floors or other hard surfaces) may be added electronically. Display 110 may be isolated by other expedients, such as thick curtains, baffles, and/or acoustic foam.

A customer 120 is able to view display 110 from comfortable furniture 130, which may include, by way of non-limiting example, a chair, couch, loveseat, or recliner. Furniture 130 is arranged at a typical viewing distance from display 110. Preferably, furniture 130 and/or display 110 are movable so that customer 120 may customize the evaluation experience to more closely mimic the customer's home viewing arrangement.

In general, the environmental variables of the retail environment product demonstration area 100 may be controlled to simulate a broad range of actual environments in which a product may ultimately be used. Environmental variables include, by way of non-limiting example, temperature, ambient light, ambient sound, room reverberation, room size, room geometry, inclination, vibration, pressure (static or dynamic), fluid motion (air/water/etc.), ports (windows/doors/etc.), and others. For instance, product demonstration area 100 may simulate the timbre and volume of an air conditioner, fan, dishwasher, or other noise, and may simulate sunlight from a window in a viewing room, light from an adjacent room, light from a lamp, light from a ceiling light, or other sources of light.

A user interface 140 is provided to control display 110. User interface 140 is configured to control the content being displayed, the source of the content, and the type and parameters of display being simulated. Thus, user interface 140 is capable of selecting from among several content sources, both local and remote. Such remote content sources include, by way of non-limiting example, broadcast television, cable television, web cast or other Internet source, radio (for audio), and satellite television. Local content sources include, by way of non-limiting example, DVD, HD DVD, VHS, laserdisc, digital video recorder (DVR), intranet, and video compact disc (VCD), media center PCs, or any other input source.

User interface 140 is preferably capable of acting as a fully-functional remote control for both local and remote content sources. Thus, user interface 140 is preferably capable of changing channels in broadcast, satellite, and cable television modes. In addition, user interface 140 may include control mechanisms for all of the features of a typical DVD player, VHS tape player, digital content source player, or source of other content. User interface 140 may be physically attached to a location at the product demonstration area 100, or may be portable. By way of non-limiting example, user interface 140 may be hand-held and resemble a typical television remote control. User interface 140 may be controlled primarily or exclusively by an employee. Alternately, or in addition, user interface 140 may be controlled by customer 120.

In general terms, the embodiment of FIG. 1 includes a first product 110 that is configured to simulate the qualities of different products as perceived by an appropriate observer, such as a human, animal, or electronic sensor. Certain embodiments of the present invention include a purchase point in the retail environment where customers may purchase one or more of the simulated products. Such a purchase point may include a traditional check-out counter such as those found in retail electronics stores. Alternately, or in addition, the purchase point may be an electronic kiosk located in the retail environment. Similarly, the display 110 itself may include purchasing capabilities. Thus, display 110 may have a system of menus, for example, that allow a customer to browse the various display products that are available for purchase. A customer may be able to actually purchase a selected display by, for example, swiping his credit card at the reference display 110 or user interface 140. Thus, display 110 may itself include point-of-purchase capability.

Examples of parameters that may be incorporated into the simulation include, but are not limited to, resolution, refresh rate, contrast ratio, brightness, color range, tint, hue, gamma, aspect ratio (display and conversion), viewing angle, pixel size/shape/composition/orientation (e.g., dots, bars, rectangles, etc.), screen size, color rendering (e.g., color rendering engine), screen shape (e.g., flat or curved), and susceptibility to ambient light. In some embodiments, the simulation may incorporate all five human senses into the simulation strategy.

Exemplary parameters associated with displays are their off-axis viewing characteristics. In general, different displays have different directivities. Thus, certain displays are brighter at perpendicular angles versus oblique angles. Such angles may be left, right, up, or down from the straight-ahead axis. Preferably, the reference display has little or no off-axis image degradation. To simulate off-axis viewing characteristics, a user reports his or her off-axis viewing location relative to the reference display. Such reporting is preferably accomplished automatically, such as via a radio-frequency coordinate-reporting device located in, e.g., portable user interface 140. The location information is reported to processing logic, which adjusts the reference display accordingly, e.g., by dimming the display in response to greater oblique viewing angles. Alternately, or in addition, a user may manually report his or her viewing location to such processing logic. The processing logic preferably simulates off-axis light output characteristics according to empirically measured samples. In general, off-axis viewing characteristics may be simulated within and across technology categories (e.g., CRT, LCD, Plasma, DLP, flexible displays, digital paper, etc.).

Another set of display parameters is associated with definition quality. For example, displays may be standard definition (SDTV), enhanced definition (EDTV), high definition (HDTV), or other formats. Each of these definitions has several associated parameters. Scanning type is one such parameter. Scanning types include progressive (p), which updates every line with each frame, and interlaced (i), which updates every other line with each frame. Resolution, typically quantified by number of vertical or horizontal lines (e.g., 480, 720, 1080), is another parameter that may be simulated. Combining resolution with scanning yields many different definition quality types such as, by way of non-limiting example, 720p, (resulting in 921,600 pixels per frame), or 1080i (resulting in over 2,000,000 pixels per frame). Other definition quality parameters include frames per second (e.g., 24, 30 or 60) and aspect ratio (e.g., standard 4:3 or wide-screen 16:9). Digital television (DTV) may have eighteen different formats, when resolution, scan, refresh, and aspect ratio are all taken into account. Each of these formats may be separately simulated. In addition to modeling display types, different interlacers may also be simulated, such as the FAROUDJA deinterlacer found in the INFOCUS XI front projector.

Different aspect ratios may be simulated as follows. There are multiple methods used to convert between standard aspect ratios (e.g., 4:3, 16:9) including reducing the size of the image and filling the unused space with black "bars," and image stretching. The conversion techniques used by a specific display can be simulated by the reference display.

Another display parameter is display technology. Display technology includes, by way of non-limiting example, cathode ray tube (CRT), liquid crystal display (LCD), liquid crystal on silicon (LCoS), plasma, digital light processor (DLP), and front or rear projectors of certain of the previously-mentioned types. Any of these technologies may be simulated on the reference display. For each of these technologies, the following exemplary non-limiting parameters may be measured and used to create a simulation: color correctness, black level, brightness, light intensity (or other measures of light, often measured in Lumens), and viewing angle effect. For DLP target displays, the following exemplary non-limiting parameters may be taken into account: type of color wheel including the number and type of colors, color wheel speed, and type of chip. Other parameters may also be incorporated into a display technology simulation, such as other parameters described herein including tint and refresh rate.

Another parameter associated with displays includes flaws in the display technology or implementation. Such flaws may be simulated on a target display, even though the target display does not inherently possess such a flaw. For example, the "screen door effect" of some LCD displays as a result of the black lines to the right and bottom of the color bars that comprise each pixel may be simulated on a non-LCD (e.g., CRT) reference display.

As another example, single-chip DLP displays are known to exhibit a "rainbow effect." This rainbow effect may be simulated on a CRT or other display type in order to accurately depict the target display technology. For instance, because the effect is caused by the rapid display of different colors of an image in rapid succession, a CRT display may simulate this effect by displaying different colors of an image at a similarly rapid succession. A 3-panel LCD display might also simulate this effect by displaying light from each panel in rapid succession instead of light from all panels simultaneously. For instance, light from the various LCD panels may be alternately blocked (e.g., by using appropriately designed and sequences masks) so that light is allowed to pass through only one panel at a time. In another embodiment, a single color wheel may be used to filter the colors of a simulated color wheel at or near the lens of a CRT, LCD, or other projector display.

Pixelization is yet another example of a flaw that may be simulated. Pixelization is a problem typically associated with LCD projectors and low-resolution display devices and may arise when a viewer is situated too close to the screen. In such an instance, the viewer may see the individual pixels, which diminishes the viewing experience. Pixelization may be simulated regardless of the reference display technology. In general, a target display's image reproduction performance can be simulated by the reference display to demonstrate the abilities and limitations in dealing with information content in the input signal. Additionally, noise on an input signal (analog or digital) can be simulated to show an effect on the image quality. The above examples are not exhaustive; other flaws may also be simulated.

Another parameter possessed by displays is the viewing surface finish (e.g., gloss, semi-gloss, matte, etc.). A high gloss finish can cause distracting reflections whereas a matte finish may reduce the apparent light output of a display. The viewing surface finish typically has other effects on the image, including affecting the brightness and contrast. The reflectivity and transparency of a display's finish could be characterized and the information used to compare displays within and across technologies.

Another display parameter is physical appearance. That is, each display is physically framed by its surrounding enclosure. This characteristic may be simulated by projecting the image of the target display around the screen of the reference display to convey the physical appearance of the simulated display. To provide a more realistic representation of a target display, the physical appearance can be incorporated into the reference display by "framing" the simulated image.

In some embodiments, the size of a display can be simulated, by way of non-limiting example, using a motor to move reference face panels (e.g., forward or backward) until the reference display appears to have the same size and shape as the target display. Similarly, image quality characteristics may be affected by including a dark border around the image, such as a black material around the edges of a projector screen. Different types and colors of borders, as well as their location relative to the image (e.g., touching the edge of the image or several inches from an image edge) may also be simulated. For instance, one or more motors may be used to move border material relative to an image.

Another parameter possessed by displays is physical weight. Physical weight may be simulated by displaying the weight of a target display on the reference display or on an auxiliary display associated with the reference display. The physical weight may be displayed numerically, symbolically, or both, for example. Alternately, or in addition, the physical weight of a target display may be simulated by physically adding and subtracting mass to the reference display. Mass may be added or subtracted by, for example, pumping water into and out of a reservoir within the reference display. A customer may be able to physically lift the reference display so configured in order to ascertain the weight of the target display whose weight is being simulated.

Another display parameter that may be simulated is user interface appearance. A reference display may simulate the appearance, and even functionality, of on-screen user interfaces (menus) of a target display. Thus, a user's interaction with configurable functions and settings may be accommodated. The appearance and interaction of the target display's on-screen user interface can be incorporated into the reference display simulation.

Further, the functionality and appearance of a remote control associated with a target display may be simulated. For example, a reference remote control having a touchscreen that is adaptable to displaying the keypad layout of a target remote control may be used. Such a reference remote control may even operate as the target remote control when virtual buttons (corresponding to the target remote control buttons) are activated via the touchscreen. The reference remote control may take the form of user interface 140, or may be a separate device.

Another display parameter involves multiple-display technology. For example, for two or more image or video sources, certain displays may accommodate picture-in-picture, and certain displays may accommodate picture-and-picture. These features may be taken into account and incorporated into the simulation.

Yet another display parameter is how performance is affected by ambient light. Some display technologies (e.g., front projection) can be greatly affected by ambient light in the viewing environment. To affect a simulation of ambient light impact, its affect on performance metrics (e.g., contrast ratio, brightness) is measured, and this information is used to simulate a display under environmental variables. Also, the ambient light of the viewing environment may be changed, such as by adjusting a light dimmer switch and turning on or off various light sources (e.g., lamps) throughout the display room to simulate real-world conditions. An electronic window shade may be used to change the amount of ambient sunlight.

Yet another display parameter is color rendering ability. There are many public or proprietary color rendering algorithms implemented in hardware, known as "color engines", (e.g., SONY's WEGA, SAMSUNG's DINE) inside display units. These color engines determine the colors in a displayed image. There are also differences in precision between color engines (e.g., 8-bit, 12-bit) that may affect the accuracy of color reproduction. The color output of competing color engine algorithms can be simulated by taking empirical measurements (e.g., by measuring light output and color intensities compared to a reference measurement) and using the same to construct a simulation. Alternately, color rendering engines may be reverse engineered to construct a simulation. In some embodiments, a reference display may be modified so that it may alternately use color renderers or other processors from various commercial display devices in order to more accurately simulate color reproduction or other features of the commercial display device. A switch may be used to switch from one processor to another.

Yet another display parameter is physical connection layout. That is, each display includes connectors for connecting the display to other electronic devices, such as DVD players, receivers, DVRs, and audio equipment. The connectors may appear on the front, back, or other part of the display. The reference display may simulate the target display's connection layout. Such simulation may be accomplished, by way of non-limiting examples, by representing the layout on the display's screen, or on another screen physically located on the reference display in analogy to the connection location on the target display. For instance, a small display located near, in front, on a side, or at the rear of the reference display may display the connection layout of the target display.

Yet another display parameter involves a display's depiction of different input types. Thus, for example, a display may depict analog versus digital input signals differently. A simulation may take such differences into account and display differences between, for example, the same video sequence encoded as analog and digital input formats. In another example, the reference display may actually use (or simulate the use of) the different image processing technologies used by the target display to render images from different input sources. In yet another example, the reference display may also simulate various video signals through a short, high-quality (e.g., component) video cable and a more degraded video signal through a long, low-quality (e.g., s-video) video cable.

Yet another display parameter involves interactivity with other devices (e.g., digital devices). Such devices may include, by way of non-limiting example, audio devices, DVRs, home entertainment devices, computers, and others. The simulation may take into account the various advantages and disadvantages of target displays with respect to operability with other devices and display a summary of such features to the customer.

Reference displays, such as display 110, may include and/or simulate, by way of non-limiting example, the following types of displays: television screens, front projector screens, computer monitors, organic displays, digital paper, flexible/foldable/roll-up, augmented reality equipment (e.g., glasses, goggles, helmets), active windows, active picture frames, "see-through" head-up (HUD) displays, astronomical display devices such as an electronic telescope, embedded displays (e.g., displays in cell phones, land-line phones, cordless phones (in either or both of the handset and base), cameras, wristwatches, MP3 players, personal digital assistants (PDAs), portable A/V electronics, photocopiers, domestic appliance, etc.), or other types of displays.

Specific techniques for simulating one display with another include the following. As discussed in detail below in reference to FIGS. 2-16, resolution and color may be simulated using various processing techniques. In addition, or in the alternative, other methodologies may be employed. A projection display may be configured to simulate various display sizes by altering its focusing optics to produce larger or smaller screen sizes within the physical display screen. A projection display may also be physically moved (e.g., by use of a motor) to move closer to or further from the screen (or to move parallel to the plane of the screen). Different sizes may be accommodated by simple truncation. The simulation may accommodate physical manipulation of the reference display device and/or signal processing to manipulate the signal input into the reference display so as to simulate a given target display.

Embodiments of the present invention may employ various types of reference displays. By way of non-limiting example, a large (e.g., 65 inch) rear projection (e.g., microdisplay) television or a front projector may be used. Either may offer an appropriate-sized reference display if none of the target displays are larger. It is possible to avoid people walking through the beam of a front-projector reference display by careful architectural design. Alternatively, the projected image could be reversed and projected from the rear. The additional space requirements may be minimized using mirrors to increase the projection distance. In general, a rear projection television would offer a smaller footprint compared to using a front projector projecting from the rear. It is also generally less susceptible to ambient light. Physically manipulating projection optics may accommodate target displays that have a physically smaller pixel size than that of the reference display. Front projectors, for example, may accurately simulate any size display by projecting through an optical zoom lens.

Certain embodiments of the present invention may employ a hybrid system using both front and rear projection displays to form a reference display. In such an embodiment, the rear projector performs the display simulation on the rear projection screen, while the projector "frames" the viewable area of the simulated display with graphics of the physical appearance of the display unit.

Certain embodiments of the present invention may use a VP2290b high-resolution nine megapixel display manufactured by Viewsonic as a reference display.

Certain embodiments may simulate differences in resolution by either up-sampling or down-sampling. Spatial transforms, discussed in detail below, allow a higher-resolution display to simulate pixel spatial characteristics of a lower-resolution display. By way of non-limiting example, a typical CRT pixel is comprised of red, green, and blue elements surrounded by a black masking line, whereas a typical LCD pixel is comprised of red, green, and blue rectangles bordered on one side and the top or bottom. A sufficiently high resolution display can re-create all of these characteristics according to certain embodiments of the present invention.

In general, a display picture starts with a certain resolution (x pixels by y pixels). Each pixel is generally comprised of at least three colors (e.g., red, green, blue). In many displays, each pixel color may have a value of 0 to 255. Up-sampling and down-sampling algorithms according to an embodiment of the present invention start with a three-dimensional (3D) map of each color as a function of the x and y pixels where the z axis (the third axis) is the color value. Up-sampling and down-sampling re-interpolate these values at different x and y pixels values than that for the original picture. Up-sampling uses a finer pixel resolution; down-sampling uses a coarser pixel resolution.

A resolution transform according to an embodiment of the present invention may be used when a higher-resolution display simulates a lower-resolution display. Each pixel value (red, green, blue) is multiplied by a spatial transform as discussed further below to determine the "simulation pixel" (which is comprised of multiple pixels) on a high resolution display.

Exemplary resolution simulation technology is now detailed. These techniques may be applicable to both display and image-capture simulation. First, typical resolution will be stated, followed by an algorithm and typical results.

TV video can be quantified with an effective resolution. This resolution is usually quantified in terms of number pixels in a vertical or horizontal direction or a total number of pixels. Other ways of quantifying resolution include an analog picture standard such as analog NTSC or a digital standard such as a digital HDTV standard.

Digital cameras (the resolution of which may also be simulated according to the present techniques) have resolution that are specified in megapixels, with the market currently at about 3-6 MP. Future resolutions of 10 MP are foreseeable. Some digital cameras also have MOVIE mode, where a typical resolution is about 320×240 pixels.

Digital camcorders (the resolution of which may also be simulated according to the present techniques) use a variety of resolutions for their MOVIE mode. Such devices are now offering 2 MP still images as well.

Typical digital video technology stores the data in a compressed JPG format. For still images, it is typically JPG, for MOVIE mode, it is typically MPEG. Pictures in JPG format can be uncompressed to produce raw data in "24 bit hicolor" format, which is comprised of three bytes, one for each color. The first eight bits (one byte) represents the amount of red, where 0 is no red and 255 is red all on. The next byte is for green, and the last is for blue. Each byte therefore addresses one red, green, or blue part of one pixel on the display.

Down-sampling is a process where data is reduced from a higher resolution to a lower resolution. Splitting high resolution data into three components (e.g., red, green, blue) allows for curve-fitting. Commercial software programs such as MATLAB, available from The Math Works of Natick, Mass., and LabVIEW, available from National Instruments of Austin, Tex., may be used for this purpose. The data can then be re-interpolated at the resolution of the display and re-combined into standard 24 bit "hicolor" format. For example, data can be down-sampled from 8 MP to 3.2 MP; however there is a loss of data in the process.

Up-sampling is a process where data is expanded from a lower resolution to a higher resolution. There is no new information added in this process, but the data is expanded to fill the array. An example of up-sampling is as follows. Suppose you have a 2 MP camera and want to display it on an 8 MP display. The simplest solution is to map every pixel from the camera to four pixels on the display. When converting from, for example, 3 MP to 8 MP, the 3 MP data can be curve-fitted, then interpolated at the new resolution. Differences in detail will likely be apparent.

In order to collect data in one embodiment of the present invention, a display to be simulated is assembled and set up on a lab table located in a darkroom. If provided, a stand is mounted to the display so it can be lifted and placed on and moved around on the lab table. Then the display is connected to a power source, and a PC/DVI input cable is connected. The display is configured to take the input signal on a PC compatible port using the display's "Source" setting. The input signal used to display test images for data collection is taken from the output connector of a standard PC video card. For initial work, an NVIDIA GEFORCE FX 5200-based VGA/DVI combo output video card is used to generate the pictures displayed. Any sufficiently capable graphics cards such as the NVIDIA GEFORCE 6800 Ultra Extreme, ATI RADEON X850 XT may also be used.

Once the input signal is sent to the display and its "Source" setting is changed to the appropriate input, the display is adjusted so that each pixel of the input signal corresponds to a single pixel on the display. In other words, there is preferably a 1-to-1 correspondence between the input signal and the pixels in the display. Displaying each pixel generated by the video card individually allows data to be collected for an individual pixel, which produces the cleanest filter routines for simulating the output of each display.

Still in reference to an exemplary embodiment, in order to optimally configure the unit, a setting such as "Aspect Ratio" or "Screen Size" may be adjusted in combination with the output display resolution (e.g., 1024×768 or 1280×720) produced by the PC's video card. By testing with combinations of these two settings, it is typically possible to generate a 1-to-1 pixel output. To test for this optimal set up, a LABVIEW application may be written which displays arrays of colored pixels, all the way down to a single pixel (1-by-1 array). Such an application may also be used to generate test images for data collection from each screen.

The physical dimensions of a display's screen and output image are preferably measured to filter and transform sample images in order to simulate a display. To do this in a consistent manner, a nine-inch-long test grid may be attached to the tested (target) displays. The scales are preferably attached to the top, bottom, and sides of the display so that reference images can be taken of the full display. Pictures may be taken with and without external illumination, without disturbing the camera set up, so both the physical dimensions and the output characteristics of the full display can be accurately measured.

To collect data for development of filtering algorithms, a darkroom may be constructed to eliminate stray environmental light. Such a room may be constructed of a one-inch diameter PVC tubing frame with cross members and wire bracing for added strength. This frame may be hung from the drop ceiling by eight strapping wires attached to S-hooks. On top of the frame, a plastic chicken wire mesh may be laid to provide a ceiling. On top of this ceiling, and from all sides, sheets of six-mil-thick black Mylar may be hung. The black Mylar sheets block out external light and help eliminate reflected light within the darkroom. The darkroom need not be film-developing quality, but can be enhanced by the addition of an outer layer of blackout cloth and by carefully locating and patching light leaks, if required.

By way of non-limiting example, a KODAK DCS Pro14N digital camera may be used to take data images. A small tripod is preferably used to securely support the camera for imaging. Initially, a manual NIKON NIKKOR 50 mm 1:14 lens may be used. A 1 GB CF memory card may be used to capture the digital image data. The camera can also be connected directly to a DELL PC via an iLink (IEEE-1394 or "FireWire") cable. Control software comes with the camera that allows remote activation and control via the ILINK connection. One way to capture data images is to set up, aim, and focus the camera in the darkroom, then adjust the exposure time and take images from the control PC. In some embodiments, some ambient light may be allowed in order to test the performance of the display in ambient light conditions.

The camera is preferably positioned using the tripod so that the camera lens is perpendicular to the display screen being imaged (as close as possible). The distance of the camera from the display is adjusted so that the desired image is properly framed. In taking data of individual pixels, the camera is preferably placed as close to the screen as possible within the limits of the lens focal length (this is approximately 1.5 feet for the aforementioned NIKON 50 mm manual lens). The lens is focused by eye to get a crisp image of the picture being displayed, or of the individual pixels in close-up data collection.

Non-reflective (or otherwise light-damping) black material may be coupled to the camera in such a way that it blocks out all (or substantially all) of light emanating from anywhere other than the target pixel. For instance, the black material may be close to or touching the screen itself, and it may have an aperture that allows light from the target pixel to pass to the camera. This may help to avoid ambient light (including light from other pixels) from interfering with the picture of the target pixel. The aperture may be larger than the size of the pixel (e.g., four times larger) to avoid diffraction effects.

It should be appreciated that for front projectors, the positions and orientations of the camera, projector, and screen may be modified to achieve the most accurate measurements. For instance, because a camera in front of a screen might otherwise obstruct any projected image on the screen (including the target pixel image), a front projector may be treated as a rear projector so that the camera is behind a translucent (or semi-translucent) screen. In some embodiments, the camera may be positioned on the same side of the projector, but the camera and/or projector may be positioned at an angle to the screen so that they do not block one another.

It should also be noted that in the case of display devices using a single-chip DLP, the shutter speed of the camera may be adjusted so that it measures the "total" color of a pixel rather than the single color that is displayed on the screen at any given time. For instance, the shutter speed may allow for light from a one or more complete rotations of the color wheel.

For the first displays imaged, the ISO speed of the CCD imager may be set to ISO 400, and the camera lens aperture may be adjusted to a setting of F8. This allows data to be collected with exposure times of no longer than $\frac{1}{10}$ of a second, but is also narrow enough to help correct for a small amount of mis-focus through its depth of field. Sample images are then preferably taken over a range of shutter speeds, generally from $\frac{1}{10}$ to $\frac{1}{125}$ of a second. Then proper shutter speeds are chosen for final data collection so that the display colors are not "washed out" (overexposure), too dark (underexposure) or irregular (e.g., speed of shutter faster than refresh rate of display signal). For imaging of individual pixels, a set of correctly-exposed pictures are taken, as well as, preferably, one or more sets of underexposed pictures. Underexposure may be helpful in eliminating saturation of the captured images, allowing for more linear filter algorithms.

The Pro14N camera has a wide variety of internal settings which may affect the raw CCD data taken and recorded to the CF memory card or downloaded to the PC. Preferably, all special effects that can be disabled are disabled. The main settings that typically cannot be disabled are: White Balance Mode, which may be set to the default value of "A (Auto)" (or another setting such as 50%), Noise Reduction, which is set to the default value of "Normal," and Image Look, which is set to the default value of "Product." In some embodiments, "optimal" settings of a display may be used. This way, a reference display may simulate the best picture quality of a target display rather than its default picture quality.

Once data images have been captured, they are downloaded to the control PC via the ILINK cable in the KODAK proprietary DCR image format. Software is also supplied with the camera to open these images. The images are then saved in standard TIFF format for conversion to BMP (Windows bitmap) format and subsequent analysis. PHOTOSHOP or XNVIEW are used to crop and/or down-sample the images to the correct size for simulation of each display.

In the case of close-up display data (see, e.g., FIG. 3), the signal "plateau" of each individual pixel can be isolated and extracted when the images are analyzed in MATLAB. This allows the color output for individual red, green, and blue pixels to be measured, as well as for a "white pixel," when all of the colors are illuminated. This data may be used as the basis for filtering a display image to simulate the output of each display.

Figure 2:
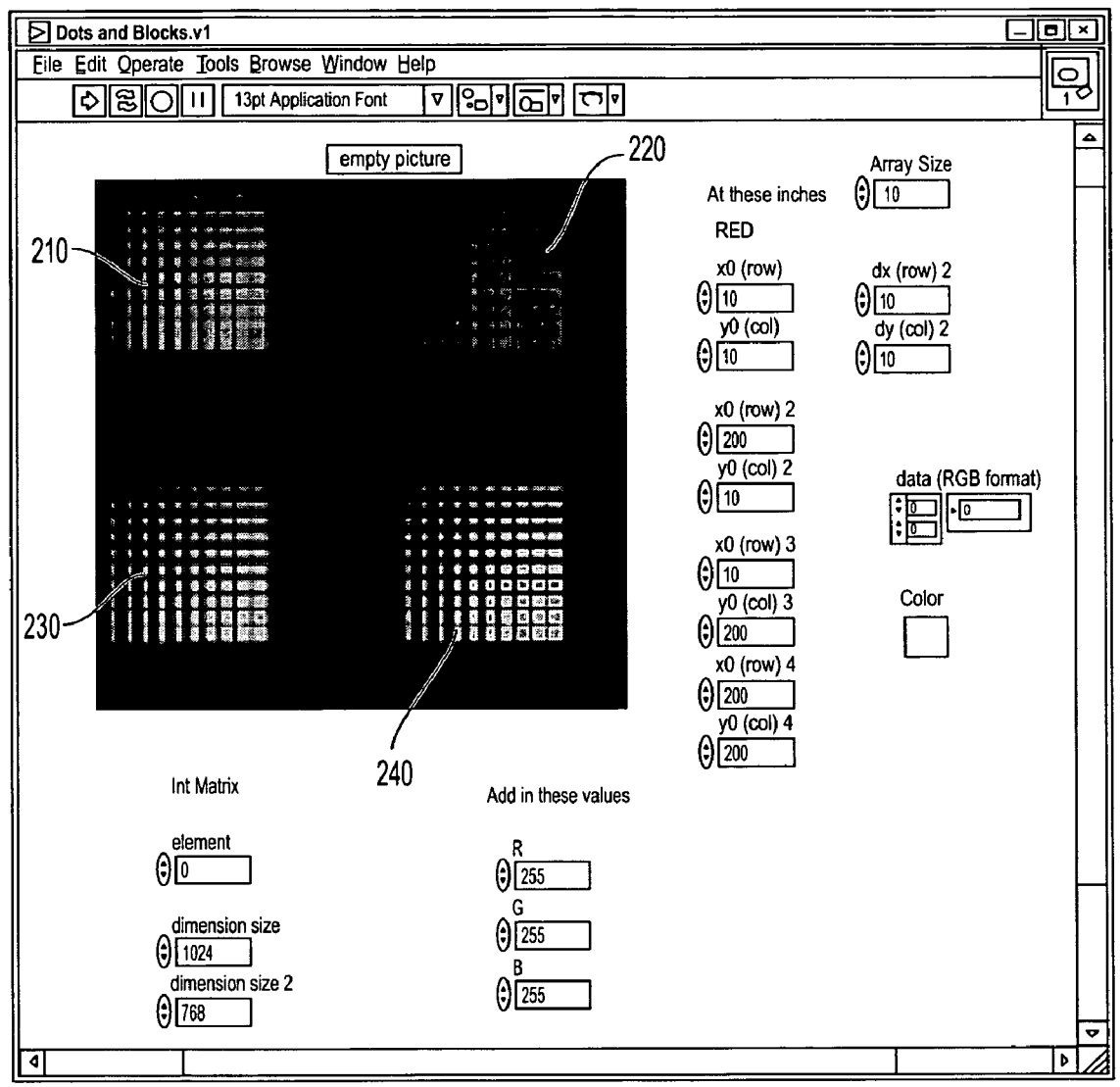
FIG. 2 depicts a screenshot of a test pattern according to an embodiment of the present invention.

FIG. 2 depicts a screenshot of a test pattern on a LABVIEW program used to produce a test pattern that can be used to gather data according to an embodiment of the present invention. In order to characterize, by way of non-limiting example, the SAMSUNG LTN325W display, the program may be used to display arrays and matrices of red 210, blue 220, green 230, and white 240 pixels on the display. The program preferably displays matrices of red, green, blue, and white pixels as defined by the user. The user is able to modify intensity, row size, column size, spacing, and resolution. FIG. 2 depicts using the program to display 1×1 to 10×10 matrices of pixels on the SAMSUNG LTN325W display in red 210, blue 220, green 230, and white 240. The display is then photographed using the KODAK DCS Pro14n 14 mega-pixel digital camera. Each color matrix is photographed at a distance of 1.5 feet, which is the minimum focal length of the lens. The data is analyzed using MATLAB in order to estimate a spatial transfer function for simulating the SAMSUNG screen on the high-resolution VIEWSONIC VP2290b-2 display.

Figure 3:
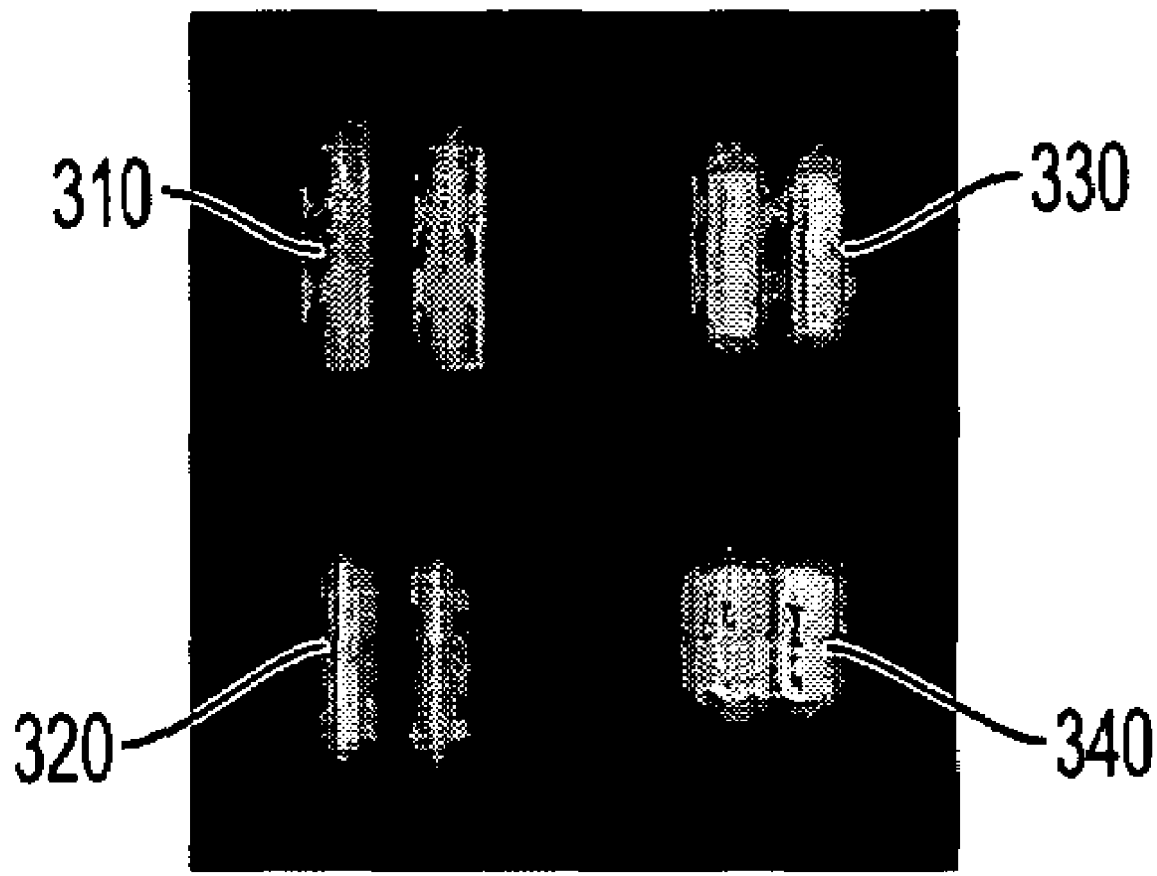
FIG. 3 depicts collected 2×2 pixel matrix data according to an embodiment of the present invention.

FIG. 3 depicts collected 2×2 pixel matrix data according to an embodiment of the present invention. In order to properly estimate a spatial transform for display of a low-resolution picture on a high-resolution display, an integral approach may be used to estimate the contribution of each color across a single pixel. In order to arrive at an accurate spatial transform, a single pixel is preferably used to characterize the spread for each color component in the pixel domain. Specifically, red 310, blue 320, green 330, and white 340 pixels are displayed. Single pixels may be removed from the images in FIG. 3 manually and surface plots may be generated using MATLAB. Exemplary resultant plots are shown below in FIG. 4.

Figure 4:
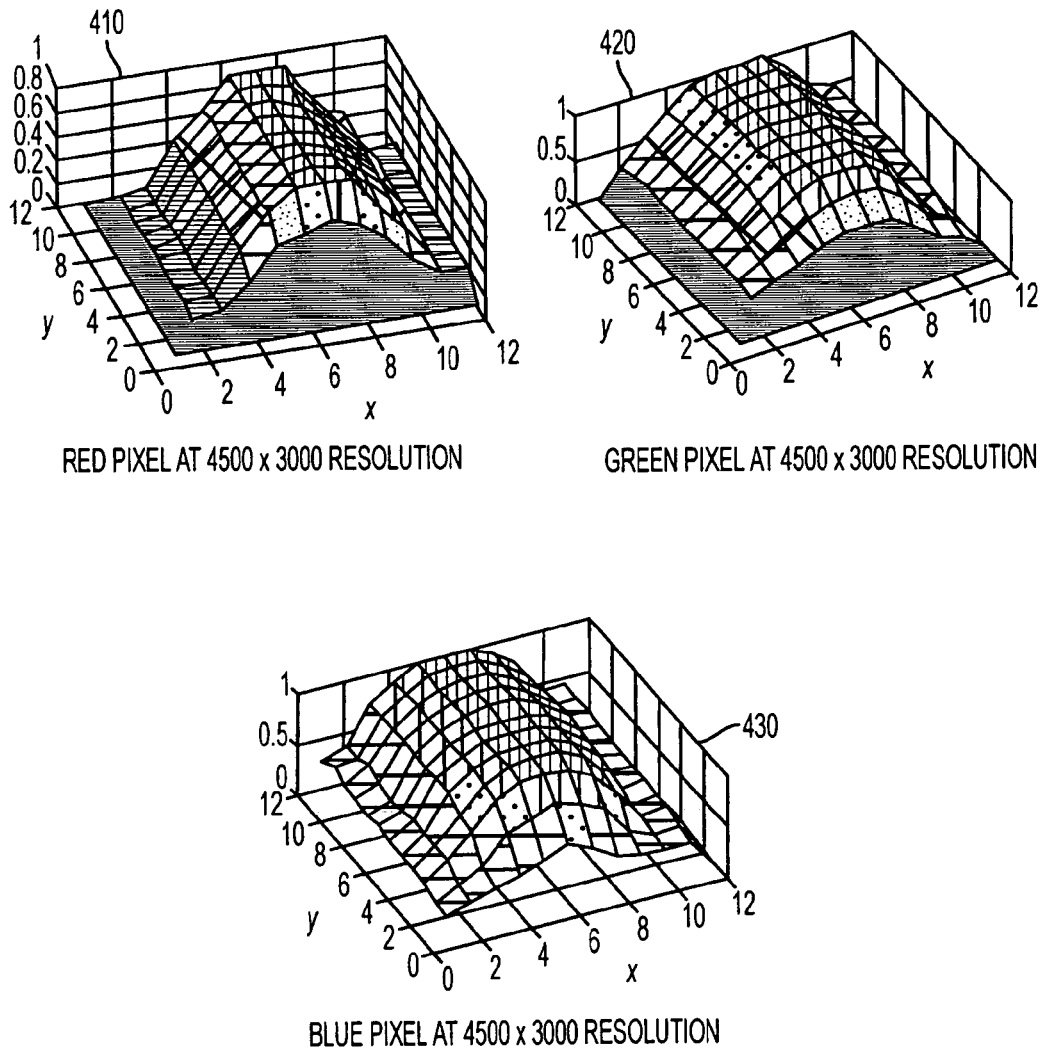
FIG. 4 depicts surface plots of the data of FIG. 3 according to an embodiment of the present invention.

FIG. 4 depicts surface plots of the data of FIG. 3 according to an embodiment of the present invention. The equivalent pixel size ratio between the SAMSUNG LTN325W and the VIEWSONIC VP2290b-2 was calculated and found to be approximately 1 to 4. The size of the pixel data shown in FIG. 4 was assumed to be 12 pixels square in the 14 MP domain for purposes of calculation. Therefore, to calculate the spatial transform between the two displays, the single-pixel distributions shown in FIG. 3 were split into 16 regions and the pixel intensity was summed over these regions to obtain the total intensity for each region. Each region was four pixels square in the 14 MP domain. The intensity for each region was divided by the total intensity within the pixel domain in order to arrive at the normalized spatial transform value for each corresponding region. This process was used to produce a quantitative estimation of the spatial transform between the SAMSUNG display and the VIEWSONIC display. FIG. 4 depicts the results for a red pixel 410, green pixel 420, and blue pixel 430, each at 4500×3000 resolution. With the distributions shown FIG. 4, the following spatial transform, shown in Table 1, was calculated. The transform is normalized to one.

TABLE 1

Transforms for Single Pixel Data

| Red Transform | | | | Green Transform | | | | Blue Transform | | | |
|---|---|---|---|---|---|---|---|---|---|---|---|
| 0.7 | 0.7 | 0.5 | 0.1 | 0.3 | 0.7 | 0.7 | 0.3 | 0.1 | 0.5 | 0.7 | 0.7 |
| 0.7 | 0.7 | 0.5 | 0.1 | 0.3 | 0.7 | 0.7 | 0.3 | 0.1 | 0.5 | 0.7 | 0.7 |
| 0.7 | 0.7 | 0.5 | 0.1 | 0.3 | 0.7 | 0.7 | 0.3 | 0.1 | 0.5 | 0.7 | 0.7 |
| 0.6 | 0.6 | 0.2 | 0.1 | 0.2 | 0.6 | 0.6 | 0.2 | 0.1 | 0.2 | 0.6 | 0.6 |

Thus, Table 1 depicts a 1×1 to 4×4 resolution and color transformation according to an embodiment of the present invention. Note that embodiments of the present invention are not limited to integer-value resolution changes. In the case where pixel ratios are not integer multiples, a curve-fit or interpolation scheme may be used. The numeric values appearing in Table 1 correspond to actual pixel values, normalized to one. The spatial transforms of Table 1 were tested and found to simulate the low-resolution image on the high-resolution display in a satisfactory manner.

Figure 5:
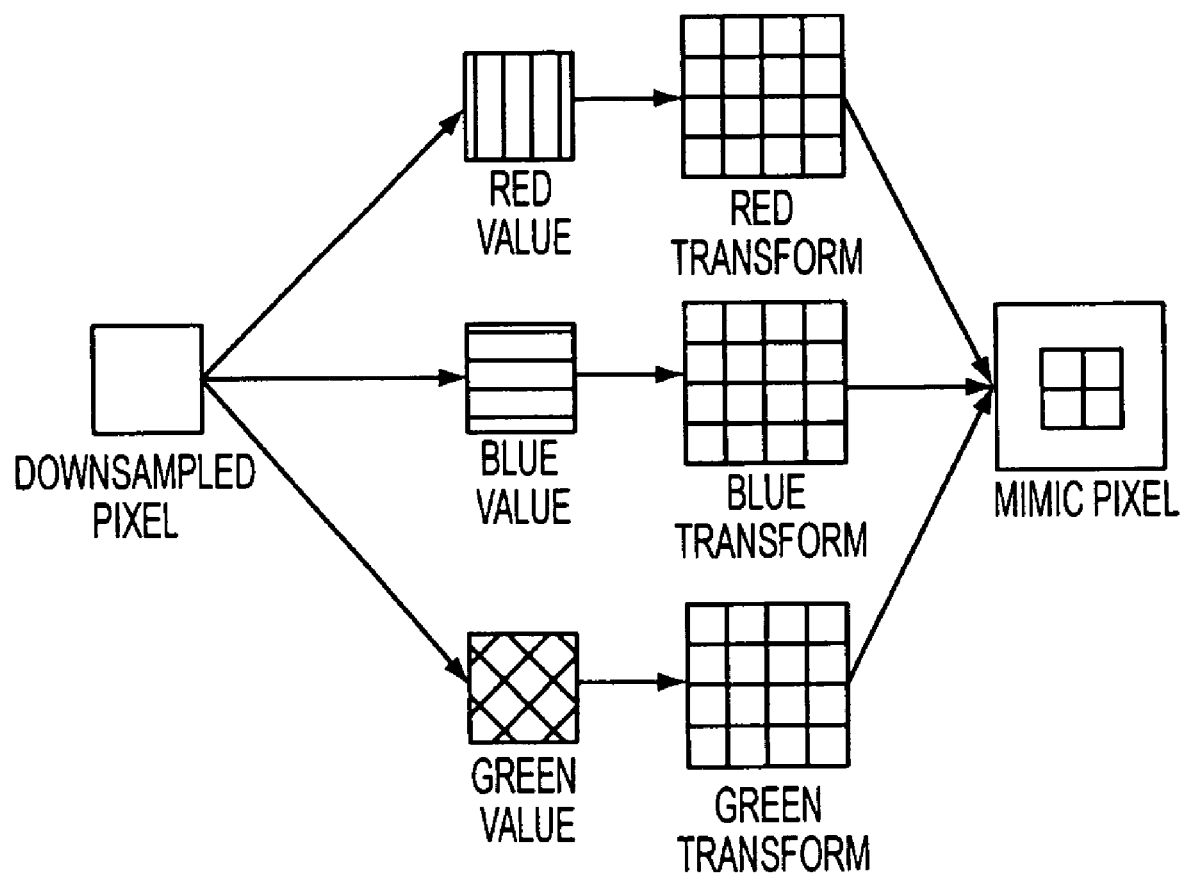
FIG. 5 is a schematic diagram depicting usage of a spatial transform according to an embodiment of the present invention.

FIG. 5 is a schematic diagram depicting usage of a spatial transform according to an embodiment of the present invention. In order to obtain high-resolution pictures for the down-sampling and simulation process, several photographs were taken using a KODAK DCS Pro14n digital camera. These images were then down-sampled to the SAMSUNG LTN325W resolution using the "griddata" function in MATLAB. In order to simulate this image on the VEWSONIC VP2290b-2 display, a new image with a resolution four times greater than the down-sampled image was created. Each four-pixel-square region of the simulation image was defined according to the corresponding RBG pixel information in the down-sampled image and the spatial transform used. FIG. 5 schematically depicts this process.

Figure 6:
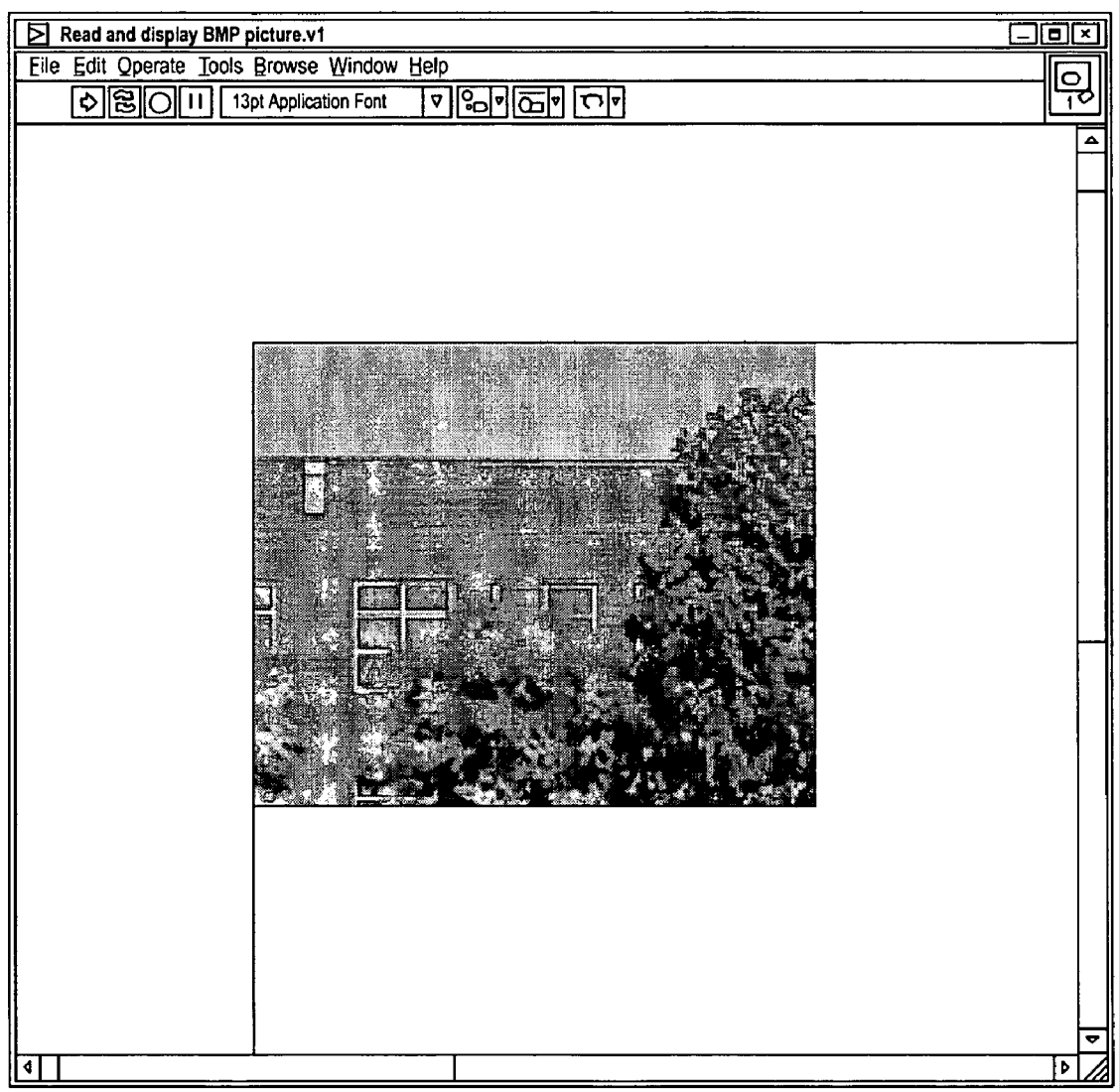
FIG. 6 depicts a screenshot of a bitmap display program according to an embodiment of the present invention.

FIG. 6 depicts a screenshot of a bitmap display program according to an embodiment of the present invention. To display the down-sampled and simulated images, a LABVIEW program as depicted in FIG. 6 may be used to display the bitmap files at actual size. A SONY VAIO computer may be used to run the SAMSUNG LTN325W display, and a DELL control computer may be used to run the VIEWSONIC VP2290b-2 display.

Thus, FIGS. 2-6 and their associated description present embodiments of the present invention that allow for simulating the performance of relatively low-resolution displays on relatively high-resolution displays. Quantitative and qualitative estimation techniques for the spatial transform between displays may further include effects such as pixel bleeding, nonlinear intensity characteristics, and artifacts due to dealing with non-integer multiple resolutions.

Embodiments of the present invention that are capable of simulating the colors displayed by various displays on a reference display are discussed below in reference to FIGS. 7-16. Preferably, the reference display has a wider color range than the target display. If not, the reference display can simulate how the target display would look with its color turned down. Similarly, the reference display preferably has a wider brightness range than the target display. If not, a the reference display can simulate how the target display would look with its brightness turned down. In some embodiments, higher brightness or contrast of a target display may be simulated by adjusting ambient light conditions. For instance, ambient light may be dimmed to simulate the effect of a brighter display, and the amount of ambient white light may be diminished to increase perceived contrast. Candidates for reference displays include high-quality three-color RGB displays, as well as multi-color displays such as those based on five, six, or more primary colors.

The definition of color is mainly based on human perception. Thus, color is not strictly a physical property of light. However, the perception of color from one individual to the next is fairly consistent, such that a standard human can be defined for the purpose of defining color. The standard color definition is based on a set of experiments conducted in 1928 and referred to as the 1931 CIE standard observer. See, for example, J. Guild, *The calorimetric properties of the spectrum*, Phil Trans. Roy. Soc. London, A230 149-187, (1929), W. D. Wright, *A redetermination of the trichromaticcoefficents of the spectral colors*, Trans. Opt. Soc. London, 30 141-164 (1928-29), and *International Commission on Illumination (CIE* 1931*) CIE Proceedings* 1931 (Cambridge University, Cambridge, 1932) p. 19, the disclosures of which are known to those of ordinary skill in the art and incorporated by reference herein in their entireties. Embodiments of the present invention include matching color according to human perception and matching color according to scientific measurements. That is, embodiments of the present invention may include either or both of analytic/empirical color matching and psycho-optical color matching.

The average human eye has 65 million cones that detect light. There are three types of cones, each sensitive to a different spectrum of light. (A spectrum of light refers to the distribution of light energy across different wavelengths.) The eye also has a number of light detecting rods that are used in low light situations and not primarily responsible for color perception. Each spectrum of light that reaches the eye excites each of the cone types to a different extent.

Figure 7:
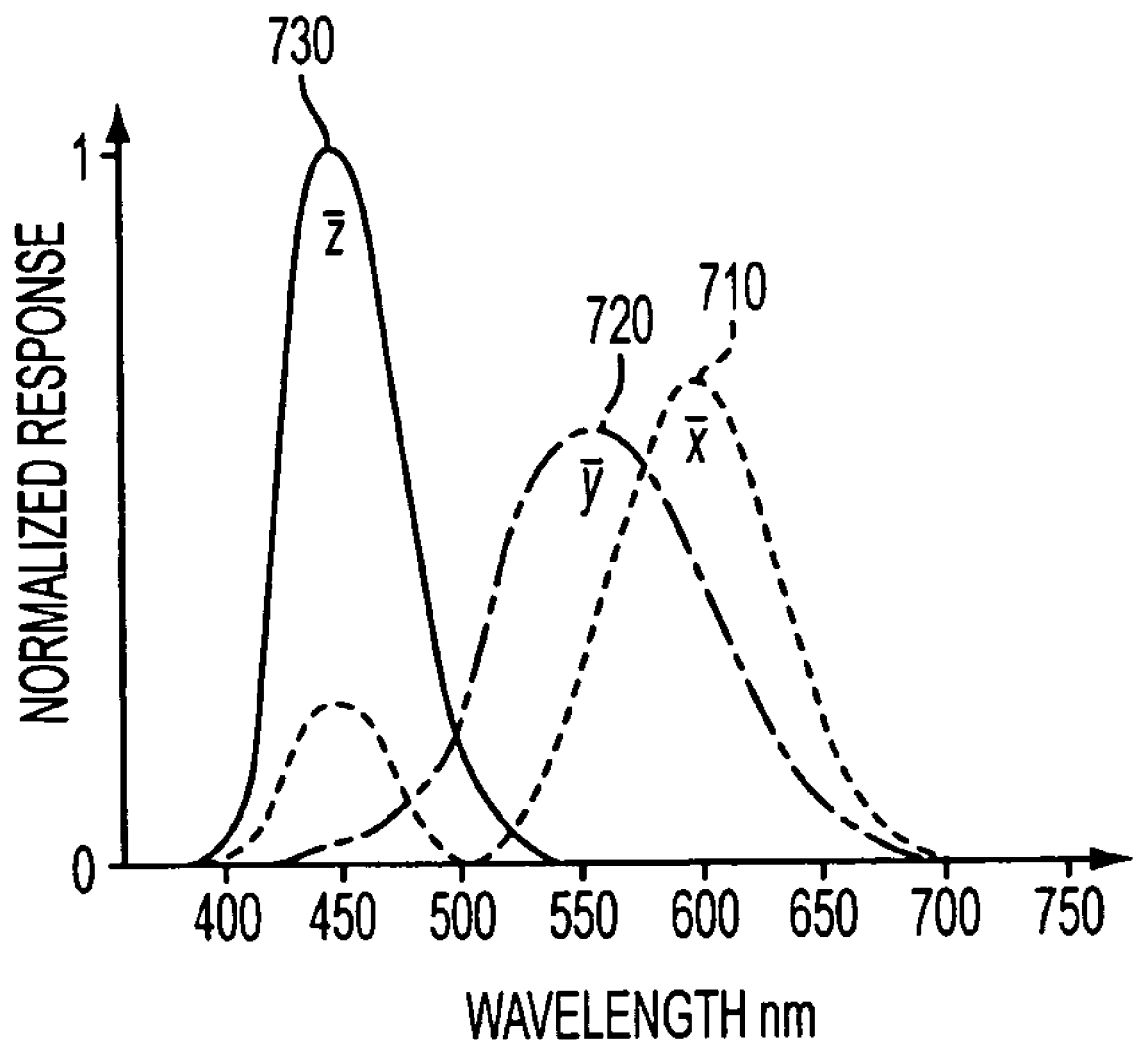
FIG. 7 is a graph depicting standard sensitivities of three cone types according to an embodiment of the present invention.

FIG. 7 shows the standard sensitivities of the three cone types denoted $\bar{x}, \bar{y}$ and $\bar{z}$ to various wavelengths of light according to an embodiment of the present invention. See, for example, D. L. MacAdam, *Color Measurement*, Springer-Verlag 1981 and G. J. Chamberlin and D. G. Chamberlin, *Colour: its measurement, computation and application*, Heyden 1980, known to those of ordinary skill in the art and incorporated by reference herein in their entireties. The sensitivity of cone type $\bar{x}$ is centered 710 at about 625 nm wavelength light. The sensitivity of cone type $\bar{y}$ is centered 720 at about 525 nm wavelength light. And the sensitivity of cone type $\bar{z}$ is centered 730 at about 425 nm wavelength light.

Figure 8:
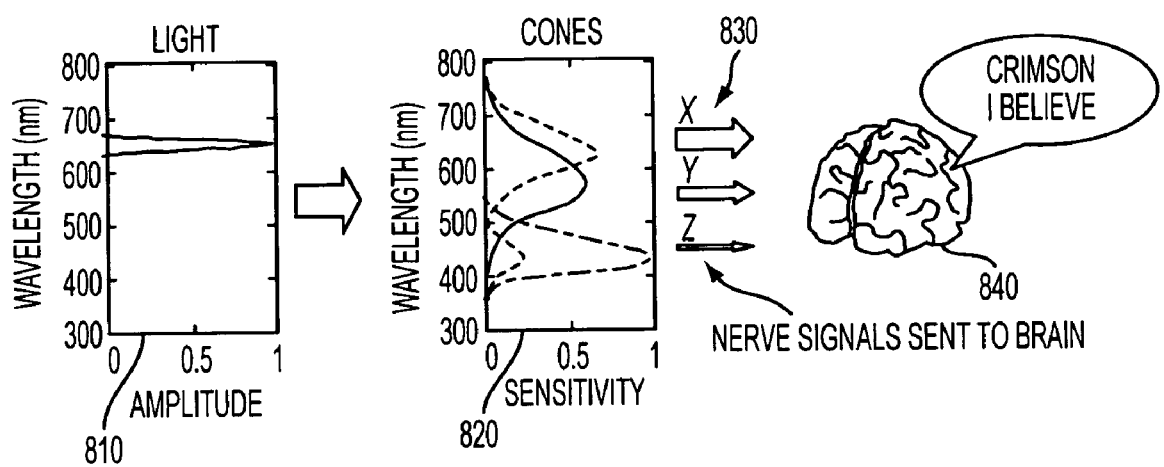
FIG. 8 is a schematic diagram depicting color perception according to an embodiment of the present invention.

FIG. 8 is a schematic diagram that depicts color perception according to an embodiment of the present invention. More particularly, FIG. 8 schematically depicts the process by which a spectrum of light 810 entering the eye is filtered by the sensitivity of the cones 820 to create three signals X, Y and Z 830 that are sent to the brain 840 to be perceived as a color. This process can be quantized into the perceived brightness of the light Y and the color of the light x and y. Conversion to x and y is relatively simple, and may be represented as, by way of non-limiting example:

$$x = \frac{X}{X+Y+Z} \text{ and } y = \frac{y}{x+y+z}. \quad (1)$$

Figure 9:
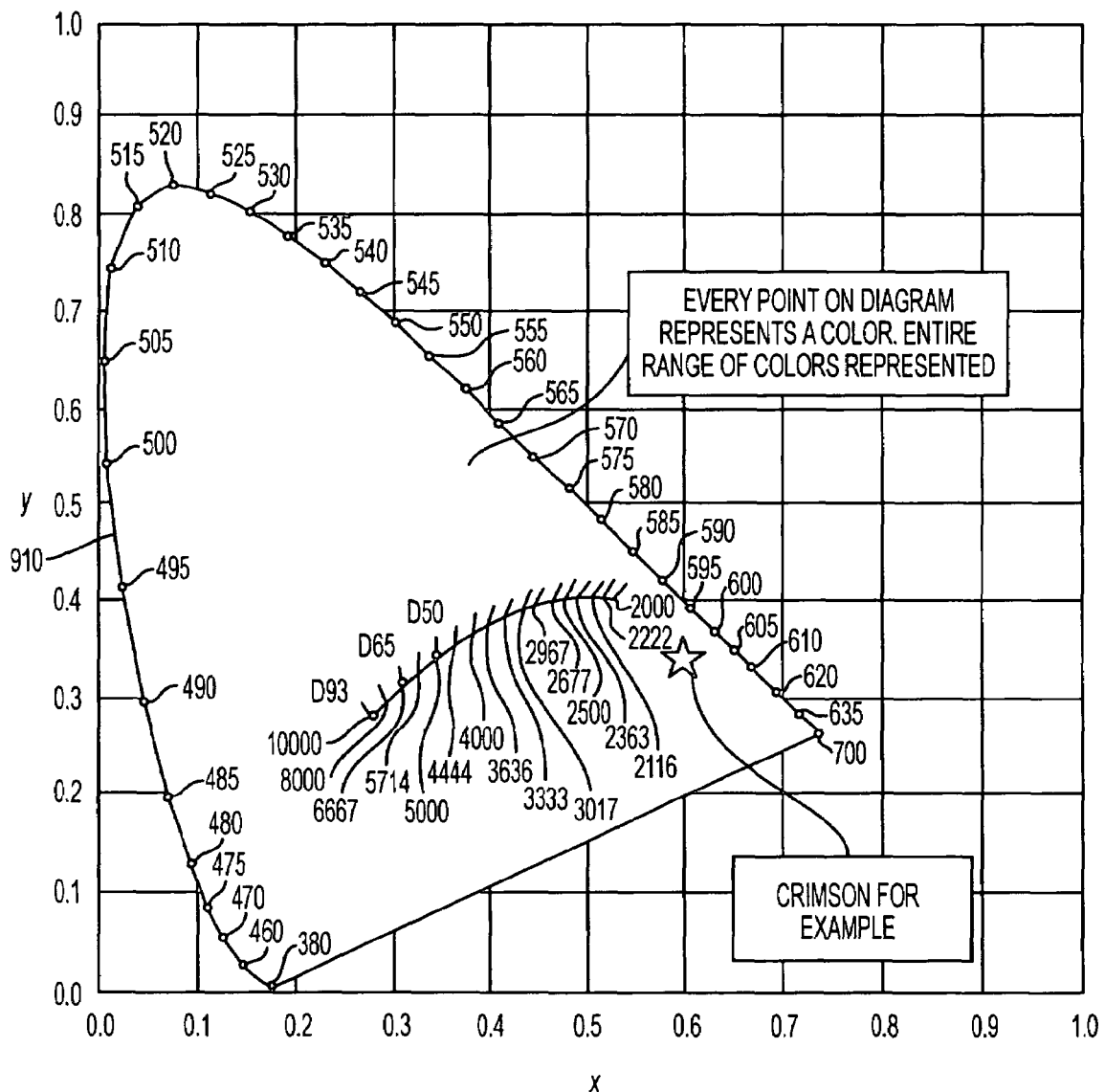
FIG. 9 is a schematic diagram representing the entire range of perceived colors on a single diagram according to an embodiment of the present invention.

FIG. 9 is a schematic diagram representing the entire range of perceived colors on a single diagram according to an embodiment of the present invention. A single wavelength of light, such as that emitted by a laser, represents an extreme in the color that the human eye can perceive. These various wavelengths are marked on the perimeter 910 of the color region. White is found towards the middle of the diagram where all of the X, Y and Z values are balanced.

Figure 10:
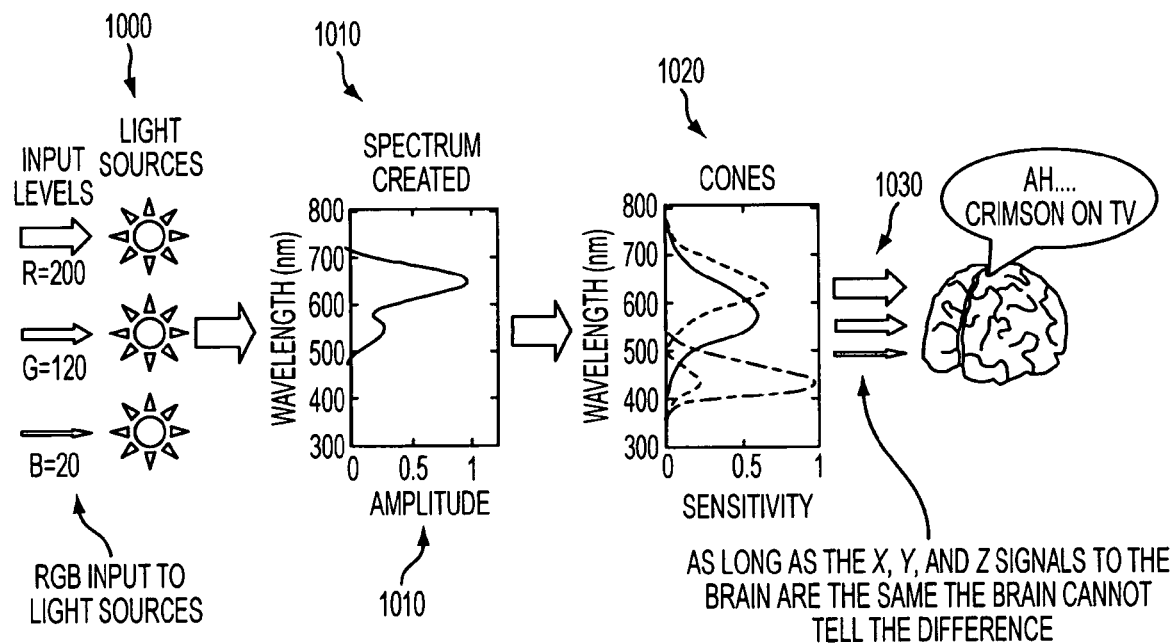
FIG. 10 shows how three primary light sources are used to recreate signals going to the brain according to an embodiment of the present invention.

FIG. 10 shows how three primary light sources 1000 (Red, Green and Blue) are used to recreate the X, Y and Z signals 1030 going to the brain according to an embodiment of the present invention. To recreate or simulate a color, it is sufficient to simply recreate the nerve signals X, Y and Z going to the brain instead of recreating the entire spectrum of the original light. Thus, the spectrum of light 1010 used by the light sources and filtered by the sensitivity of the cones 1020 need not be identical to the original spectrum.

Figure 11:
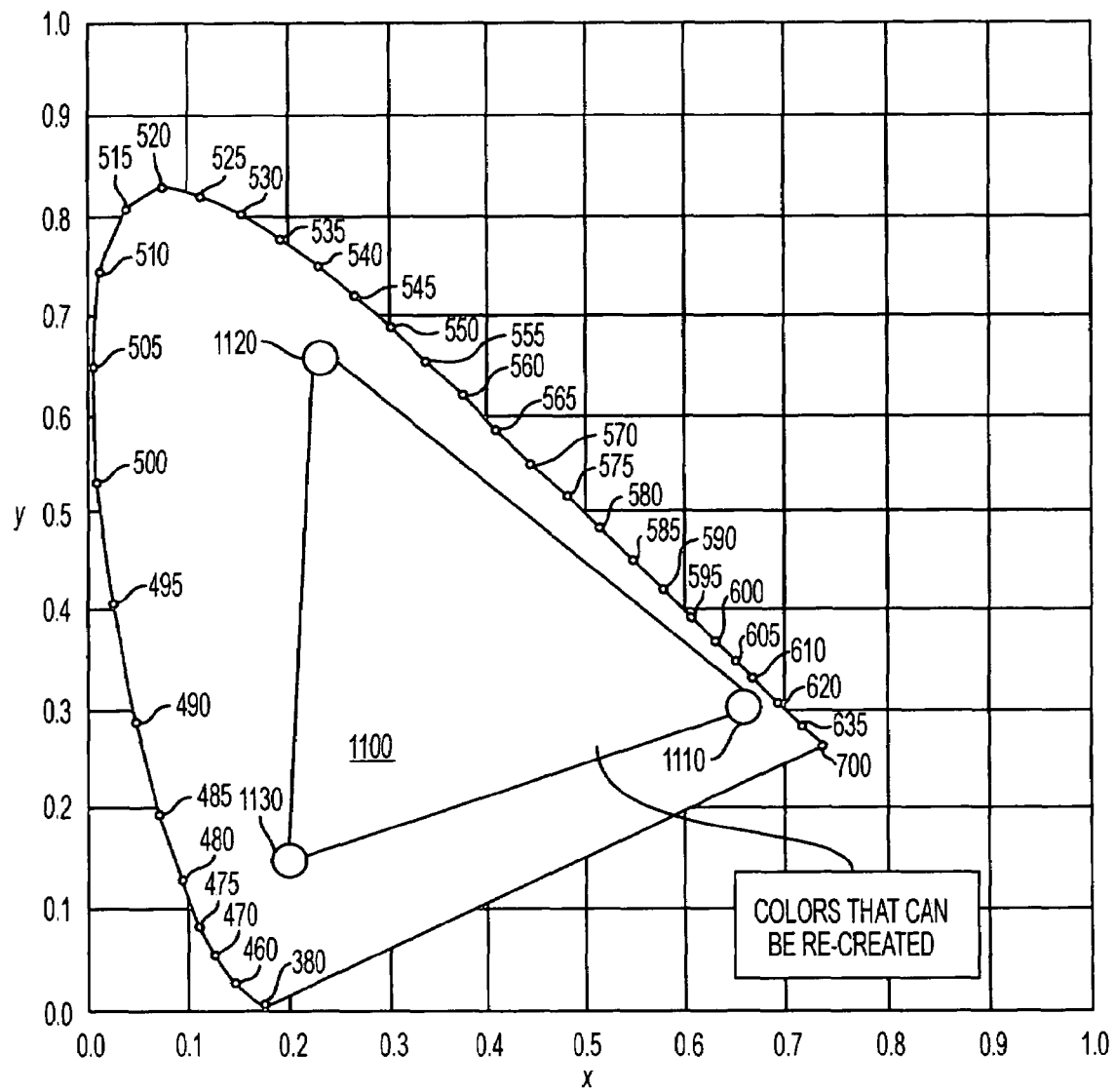
FIG. 11 depicts a region or range of colors that can be recreated using various combinations of primary colors according to an embodiment of the present invention.

FIG. 11 depicts a region or range of colors that can be recreated using various combinations of primary colors according to an embodiment of the present invention. In the 1931 CIE color space, the three primary colors (e.g., red 1110, green 1120, and blue 1130) define a triangular region 1100 or range of colors that can be recreated using various combinations of the primaries. Every display technology has slightly different primary colors and therefore a different range of colors or color palette. If one reference display is used to re-create the colors of another target display, then it will generally be necessary for the reference display to have a wider range of colors than the target display.

Figure 12:
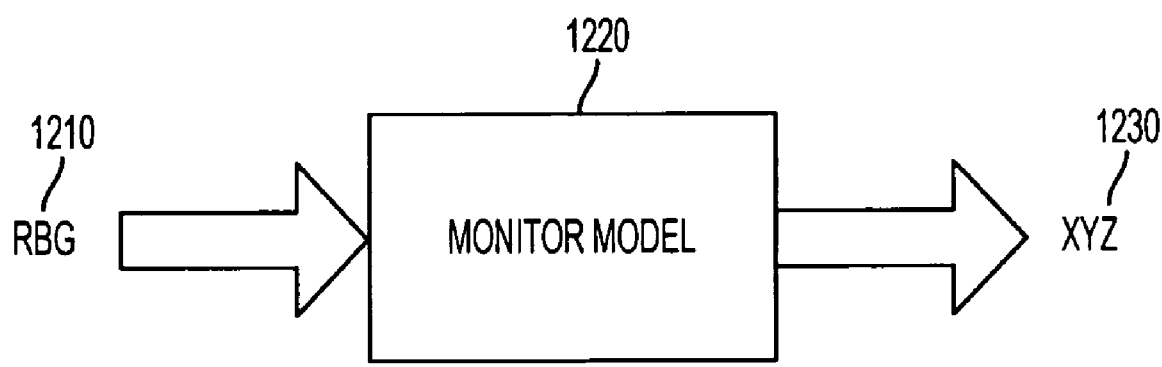
FIG. 12 is a conceptual diagram of a display as an input-output device according to an embodiment of the present invention.

FIG. 12 is a conceptual diagram of a display as an input-output device according to an embodiment of the present invention. In general, a color is specified on a display using three eight-bit numbers (RGB 0-255). Therefore, every display can be viewed as an input-output device 1220 where the RGB values 1210 act as the input and the XYZ values 1230 as the output. In principle, the RGB inputs to the display should always be proportional to the output light from each of the primaries. This is not, however, necessarily the case in practice. In many cases, RGB inputs below 50 produce little or no light, especially with high-contrast settings.

Figure 13:
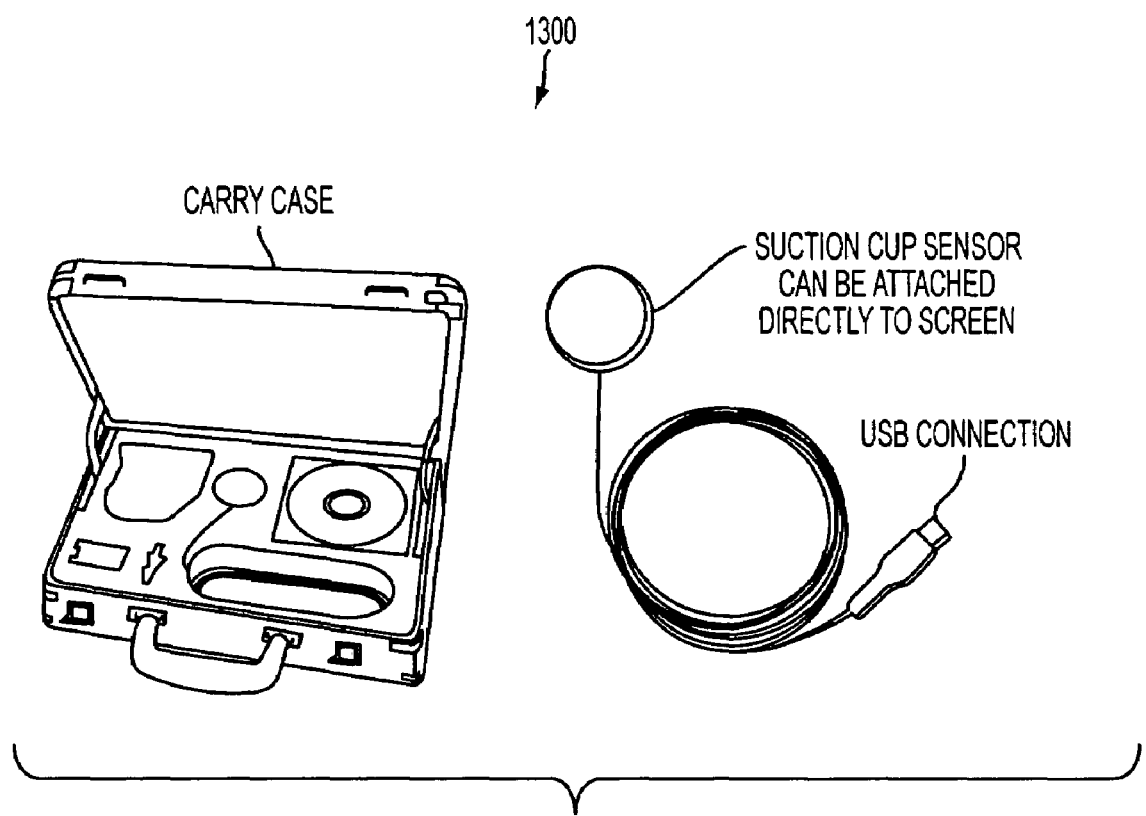
FIG. 13 depicts a sensor for measuring a display's properties according to an embodiment of the present invention.

FIG. 13 depicts a sensor for measuring display properties according to an embodiment of the present invention. A MILORI TRICHROMAT sensor 1300 with COLORFACTS software may be used to measure the XYZ light outputs from the displays. In this way, an input RGB value is used to create a color on a display and the TRICHROMAT sensor is then used to measure the corresponding XYZ values. The more accurate the sensor, the more complete the characterization of the display may be. This specific sensor is suitable for CRTs and Plasma screens. Preferably, the sensor is capable of measuring the light radiated normal (i.e., at right angles) to the screen. Such a capability will reduce certain errors associated with measuring LCD displays.

The following observation has an impact on how displays need to be characterized. It turns out that for a useful characterization to take place, it is not always sufficient to separately characterize the R, G and B input to XYZ output levels and naively combine the results in a linear manner. Consider, by way of non-limiting example, the following approach. If the XYZ=[10 20 5] is measured for a G=200, R=B=0, and XYZ= [20 8 3] is measured for a R=200, G=B=0, then one possible extrapolation is that R=G=200, B=0 would lead to XYZ=[10 20 5]+[20 8 3]=[30 28 8]. Such a linear extrapolation is a reasonable model for certain displays (e.g., CRT displays in some instances), but not for certain other displays.

The non-linearity discussed above may be modeled according to a variety of techniques. Thus, certain embodiments of the present invention model according to some or all combinations of RGB levels. Some embodiments account for 256×256×256=16,777,216 different RGB combinations. In other embodiments and by way of non-limiting example, six different RGB values may be used to approximate the total color space by way of interpolation. Thus, 6×6×6=216 measurements are taken for each display. Again by way of non-limiting example, RGB values of [0, 51, 102, 153, 204 and 255] may be used. In embodiments that use less than all RGB combinations, a cubic spline in MATLAB may be used to estimate the XYZ output values between the measured points. This is essentially three different 3-D curve fits, one for the relationship between the input RGB values and each of the X, Y, and Z outputs. A MATLAB function may be used to take the raw measured data from the MILORI sensor and find the spline coefficients. Another function may be used to take the spline coefficients and create a finer set of grid of points (for example, those shown in FIG. 14). Other extrapolation algorithms, other than cubic spline, may be used in the alternative.

Figure 14:
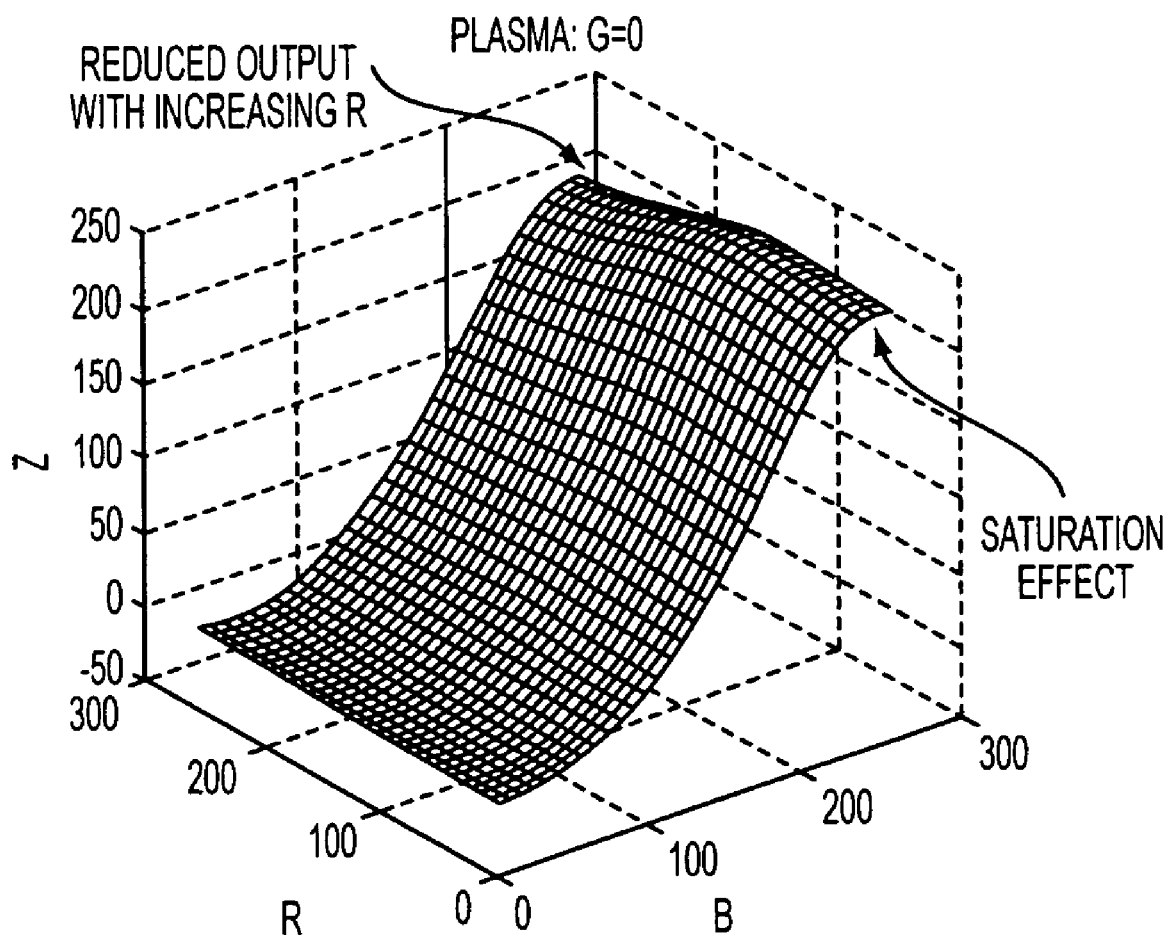
FIG. 14 is a plot of certain measured output of a plasma display for certain inputs according to an embodiment of the present invention.

FIG. 14 is a plot of measured Z output for a plasma display for different B and R input levels when G=0 according to an embodiment of the present invention. For high values of input B (approx 255), increases in input R actually cause the output Z to go down. This inverse relationship not accounted for by any of the normal definitions of gamma, contrast, etc. FIG. 14 thus illustrates at least one type of non-linear display response.

Figure 15:
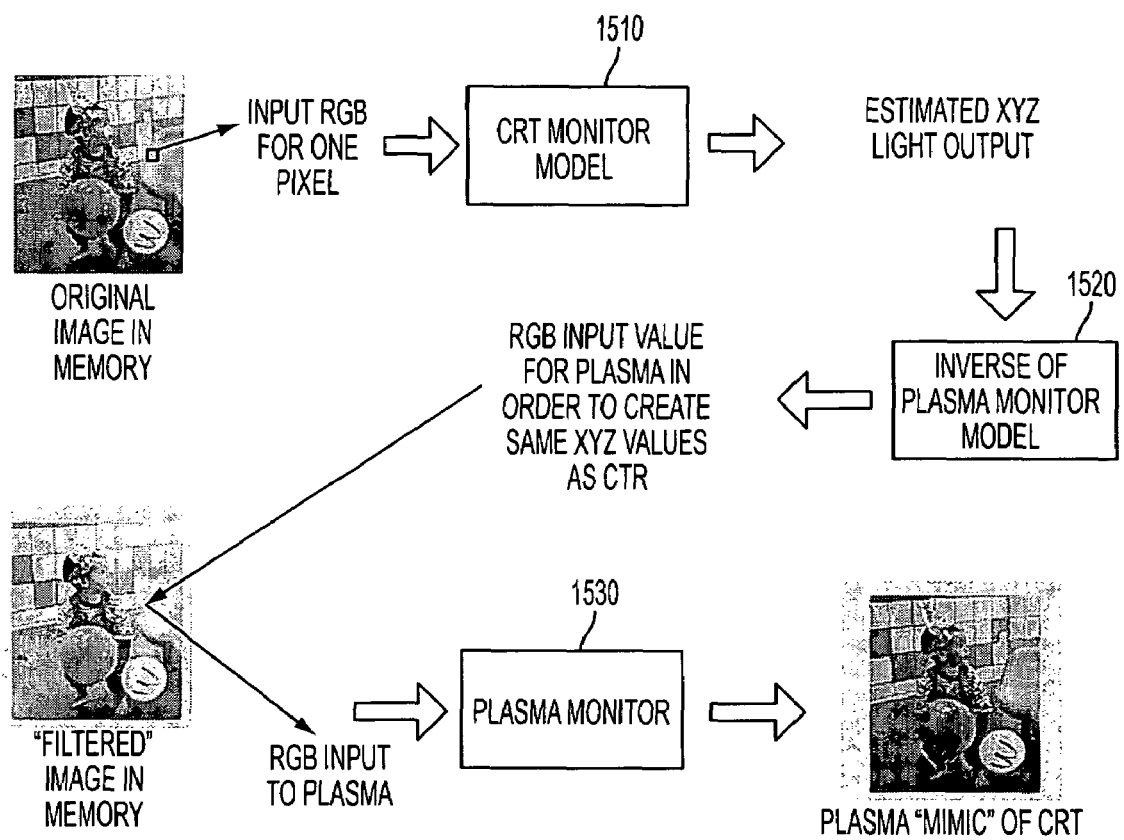
FIG. 15 is a schematic diagram illustrating a general methodology for creating a color simulation according to an embodiment of the present invention.

FIG. 15 is a schematic diagram illustrating a general methodology for creating a color simulation according to an embodiment of the present invention. The methodology finds an input to a reference display in order to achieve the same color output as the color output from a target display. This is preferably done for the entire range of possible input values to the target display. As explained in detail below, the methodology creates a color simulation mapping between each set of input values to the target display and the appropriate input values to the reference display in order to simulate that color.

For purposes of illustration, CRT and plasma displays are used as examples, but the methodology described herein may be used with any pair of displays. In order to create a simulation of a picture displayed on a CRT target display using a plasma display as a reference, the process first characterizes the RGB to XYZ performance of both displays at 1510 according to the techniques described above.

At step 1520, the process determines the inverse of the plasma display model. If a system is linear, then it is relatively easy to find the inverse since the system can be described by a relatively simple set of equations or matrices. For a coupled non-linear system, as described above, the process is more complex. For every possible RGB input to the CRT, a suitable RGB input value for the plasma display is found that creates the same XYZ output. In this way, steps 1510 and 1520 are combined to create a mapping between the RGB input to the CRT to an equivalent RGB input to the plasma. This can be accomplished, by way of non-limiting example, using a 16,777,216-point lookup conversion table. Mappings that employ extrapolations may alternatively be used. Once this color simulation mapping is known, it is relatively computationally efficient to convert all of the pixels in an original picture into the filtered image. A sequence of converted pixel instructions for a video clip may be recorded so that it can be played back in real-time.

A process for creating a mapping is described presently. For purposes of illustration, assume that the RGB value for the original image is [90,156,180]. For the CRT, this leads to an expected XYZ output value of [48.32 56.82 105.66]. The objective now becomes to find the RGB input to the plasma reference display to most accurately match this output level. At this point, three issues arise: (i) there may be no exact matches since the space is not continuous and therefore a search for nearest match may be used, (ii) what is an appropriate metric for "nearest," and (iii) what happens when there are no points nearby to choose from.

Regarding (i), searching the space to find a point can be done in MATLAB using a find routine. Improvements could be made by using a pre-sorting routine and using the results from the last iteration (say when the input was [90,156,179]) to help narrow the search.

Regarding (ii), a least squares routine, which is equivalent to distance in XYZ space, may be used to find the "nearest" match. This distance may not correspond to actual perceptual distance, because XYZ is not a perceptually uniform space (e.g, a typical human might be able to tolerate larger changes in Y than in Z, for example). In order to improve this, the data may be converted to xyY space. In this space, the brightness or Y value is matched first. That is, a tolerance value, e.g., $\Delta Y=1\% Y$, is used so that only points within ±1% brightness are selected. From within this subset the nearest color match in xy space (least squared or distance d) is then chosen as the best fit.

Figure 16:
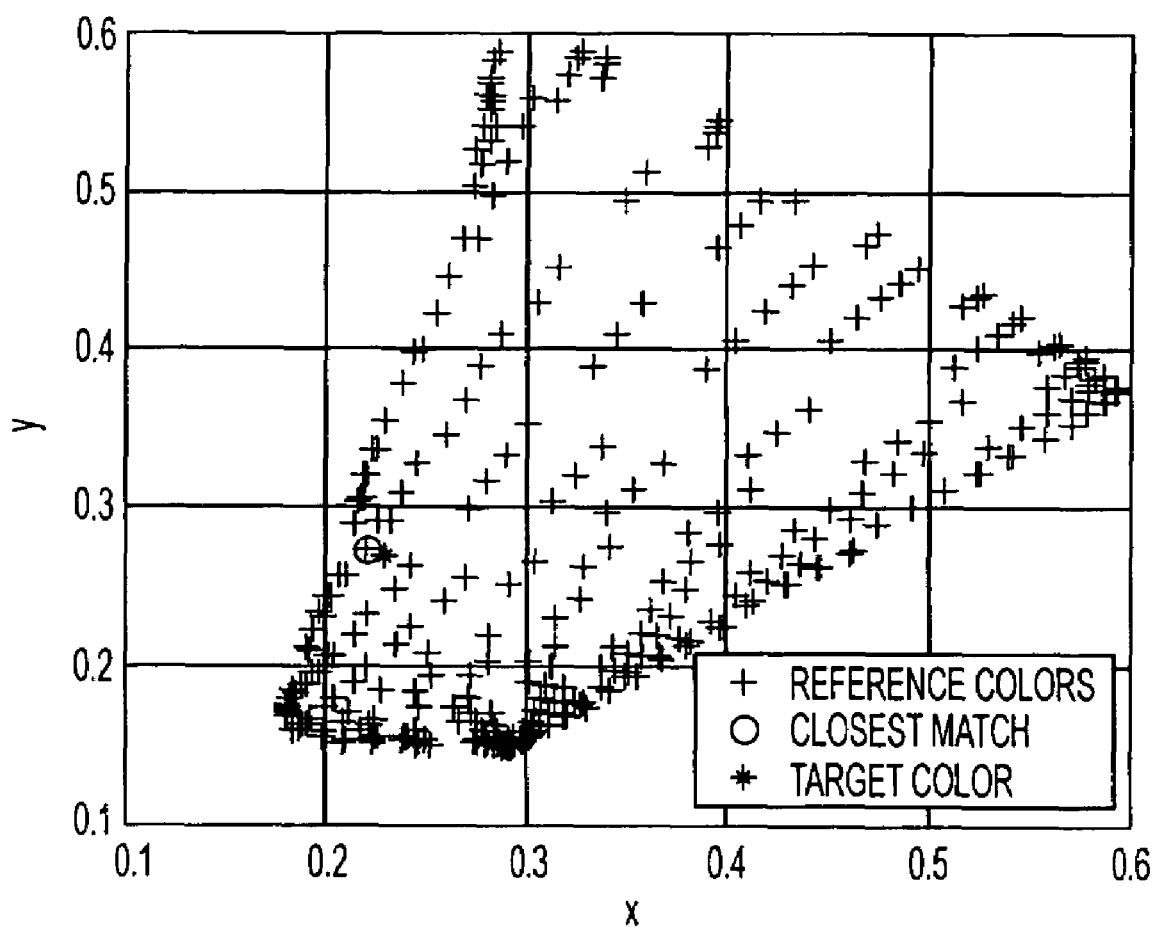
FIG. 16 is a graph depicting a nearest color match according to an embodiment of the present invention.

FIG. 16 is a graph depicting a nearest color match in xy space according to an embodiment of the present invention. Continuing the above example, the graph of FIG. 16 shows all of the possible colors from the reference that lie within 1% of the target brightness of Y=56.82. For clarity of exposition, a 5-bit color is used because a full 8-bit color produces a very large number of points. The closest color match is then chosen from this group.

The following are with respect to (iii), that no points are nearby. One possible solution is to have a tolerance value to be satisfied. For example, such a tolerance may take the form of: d must be below a minimum distance $d_{min}$. There is also the possibility that there are no good matches in the brightness Y. If the reference display is not as bright as the desired target color, then it is possible that no points lie within 1% of the target brightness. To overcome this issue, the tolerance range $\Delta Y$ may be increased until a suitable (though less bright) color match is found. If the reference display does not have as wide a color palette as the target display, the target color can be "whitened" by diluting the colors by a factor $\delta$. By way of non-limiting example, the following formulas may be used:

$$x_{whitened} = \frac{\delta}{3} + (1-\delta)x, \quad (2)$$

$$y_{whitened} = \frac{\delta}{3} + (1-\delta)y, \text{ and}$$

$$y_{whitend} = y.$$

The whitening process may find a color that is similar, but with reduced brilliance. In effect the target color is pushed towards the point x=0.33, y=0.33. It is possible that both issues may occur simultaneously: that the reference display is not as bright as the desired target color, and that the reference display does not have as wide a color palette as the target display. In general, it is more important to match the color closely (i.e., x and y) than to match the intensity Y.

Techniques for finding the nearest color may include taking contours of color perception into account. Thus, such techniques may account for "the nearest" in xy space being different from "the nearest" in our perception of color.

In some embodiments, color measurements may be taken for a target display device using different settings of the target display device, such as brightness, contrast, and hue. For instance, measurements may be taken for a target display with the brightness and contrast set to 25% and 50%, respectively, and another set of measurements may be taken with the brightness and contrast set to 75% and 10%, respectively.

Measurements may be taken for any combination of settings, such as, by way of non-limiting example, the following: (brightness=25%, hue=25%, contrast=25%, 50%, 75%, and 100%); (brightness=25%, hue=25%, 50%, 75%, and 100%, contrast=25%); (brightness=25%, 50%, 75%, and 100%, hue=25%, contrast=25%); and (brightness=50%, hue=25%, contrast=25%, 50%, 75%, and 100%).

Because a target display may have a different color scheme at each different setting, the measurements at a given collection of settings may effectively be treated as relating to a different "target display" for purposes of modeling. Thus, in the same way that the reference display may simulate a target display at its default (or calibrated, or "optimal") settings, it may also simulate its behavior at other settings. For instance, a customer viewing a simulated target display may wish to see what the target display would look like with a lower contrast setting. The reference display may accordingly simulate the same target display using a target display profile that was determined based on a lower target display contrast setting.

It should be appreciated that by taking a large enough sample of measurements, the effect of any single control (e.g., contrast) on the light intensity and color of a pixel may be predicted, e.g., by curve fitting the data. An associated curve may be determined for the reference display so that it can simulate the effect of a changed setting on a target display it is simulating. For instance, the effect of setting the hue of a target display to 75% when brightness is at 60% may be extrapolated from the two sets of measurements taken when the hue was 75% and the brightness was set to 50% and 75%. Thus, in some embodiments, the effect of lowering the contrast (or otherwise changing the settings) of a simulated target display may be extrapolated based on a single profile of the target display (or multiple profiles of the target display) and a curve or function associated with the target display that indicates the effect of the changed setting.

Similarly, the reference display may be measured at a plurality of different settings for brightness, contrast, and other picture control settings, as described above for the target displays. Each of these reference settings may be mapped in a table (or other mathematical model) as described above. Curve fitting and other mathematical methods may be used to determine the effect of changing each setting such as tint (e.g., in combination with changes made to other settings) on the output of the reference display.

The plurality of reference measurement sets may effectively be used to create different reference profiles. Then, instead of using a single set of reference settings (e.g., the default or "optimal" calibrated settings) to simulate a target reference display, any of several reference settings may be used to simulate a particular target display. For instance, one target display with an inherently low brightness may be best simulated by the reference display set to a low brightness setting. These settings may be automatically adjusted, e.g., by causing logic and/or controllers to automatically input the change in settings (e.g., by causing a motor to turn a knob that controls "hue").

In addition, changes to the reference display's settings may be used to simulate changes to a target display's settings. For instance, it may be determined that increasing the hue on the target display from 40% to 50% (for a given set of target settings) would have a similar effect to increasing the hue by 5% and decreasing contrast by 10% in the reference display (for a given set of reference settings). In some embodiments, mathematical methods may be used to map a target display's settings to the reference display's settings, such that any change to the target display's settings may be translated into a change to the settings of the reference display.

In some embodiments, light intensity of target and reference displays may also be measured and simulated. For instance, a device that measures light intensity (e.g., in lumens) may be used to gauge the light intensity of the output of a variety of different display devices (e.g., such as a television or front projector, or a front projector with a particular screen and configuration). The light intensity of a target display may be simulated by changing a variety of variables, including settings (e.g., brightness) of the reference display and ambient light conditions. Also, filters may be applied to the reference display (e.g., an electronically controlled filter that can be activated or moved onto the reference screen) to reduce its light output. For instance, a polarization filter may be applied to the lens of a reference front projector. Higher light intensity may be simulated by reducing the amount of ambient light, for example.

In sum, a color simulation embodiment may have the following features. First, non-linearity of RGB combinations may be taken into account, and the technique may be fully coupled. To that end, the color sensor may measure XYZ. Second, a complete model, which can be considered as a mapping between every RGB input to every XYZ output, may be developed. Such a model may be constructed by extrapolating the measured data to cover the entire 256 by 256 by 256 range of possible RGB inputs. Third, a color simulation embodiment may include a mapping between the RGB input to the target display and the RGB input to the reference display. To that end, the inverse of a reference display may be combined with the target display model such that an appropriate RGB input to the reference display is found for every RGB input to the target display, so as to create the equivalent light output (color and brightness). Such a mapping may be used to filter an image or picture for display on the reference display. Fourth, the inverse of the reference display may be employed. That is, for a target xyY color/brightness, the outputs from the reference display are selected for brightness and then the nearest color in xy space is found.

The techniques described above may be applied to simulate displays with more than three primary colors. Thus, displays with four or more primary colors may be simulated. For instance, a DLP projector that creates color using a five-segment color wheel may be simulated.

According to certain embodiments of the present invention, multiple target displays may simultaneously be simulated. Such embodiments allow for comparison between two or more target displays. Techniques for accomplishing such comparison include having side by side images on the same display, having a left-right "mask" over the full-screen image where each half is simulating a different display, switching between full screen images on the same display, and having two physical reference displays.

Embodiments of the present invention include simulating displays other than video displays. Such displays include, by way of non-limiting example, printing devices. Parameters that may be simulated include, by way of non-limiting example, resolution, color, and physical pixel characteristics, such as size, shape, spatial density, and orientation. Color printers typically use different primary color sets (e.g., RGB, CMYK, etc.) which are combined to produce all the colors that can be represented. In addition to absolute color range, the output from printers using different primary color sets could also be simulated. Other printing devices amenable to simulation include, by way of non-limiting example, photo printers, computer printers (personal/business/professional/ etc.), fax machines, (photo)copy machines, and mimeograph or other technology that produces a hard copy representation of information by applying discrete doses of pigment/toner/ etc. to a physical substance, such as paper.

According to an embodiment of the present invention, the techniques taught herein for simulating a target display on a reference display may be used to calibrate displays for consistency. Such techniques may calibrate individual displays for consistent color, brightness, or other parameters. Displays that are publicly viewable over long periods of time are particularly suited for such embodiments. By way of non-limiting example, the following display types may be calibrated for consistency: Jumbo-trons (e.g., in sporting venues or Time's Square), the JEOPARDY! television wall, and television production control rooms.

Embodiments of the present invention that are capable of simulating image capture devices such as cameras and camcorders are discussed below in reference to FIGS. 17-21.

Figure 17:
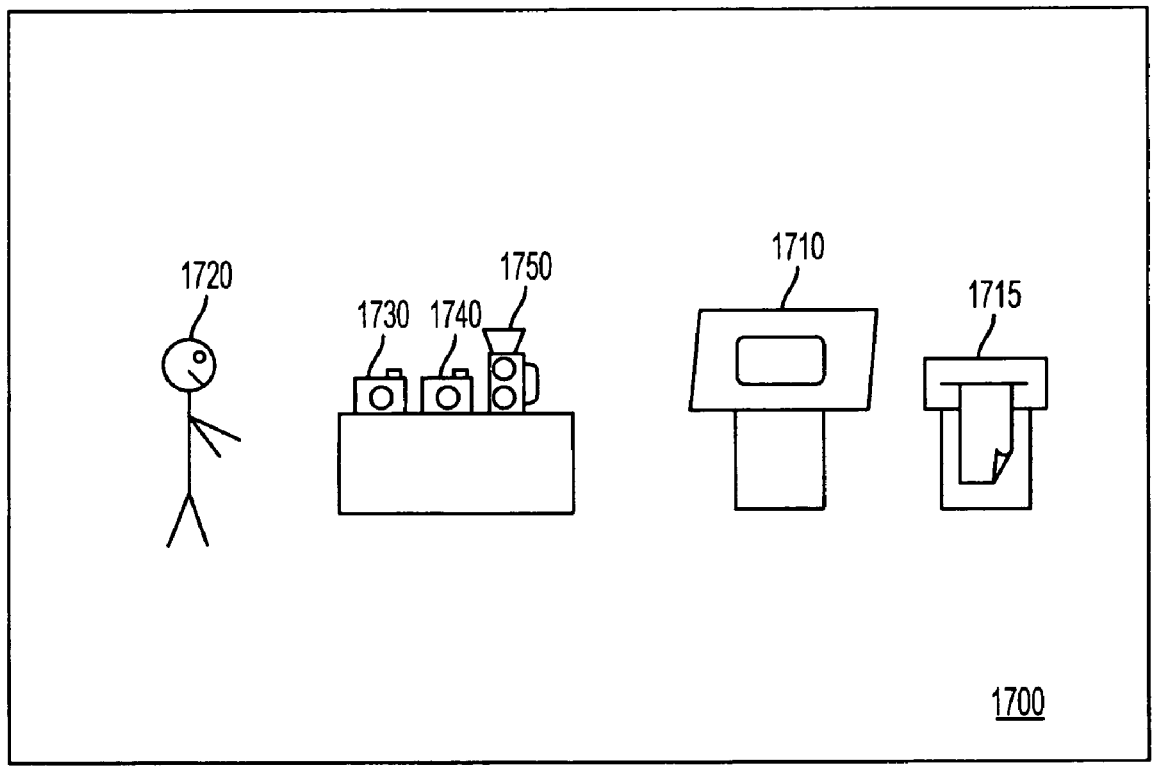
FIG. 17 is a schematic diagram of certain features of an embodiment of the present invention.

FIG. 17 is a schematic diagram of certain features of an embodiment of the present invention. This embodiment includes a product demonstration area 1700 situated in a retail environment, similar to 100 of FIG. 1. In general, the retail environment is part of a retail electronics store. As with display 110 of the embodiment of FIG. 1, display 1710 is preferably located in an environment that is acoustically and visually isolated from sound and light sources. The embodiment of FIG. 17 allows a customer 1700 to compare various image capture devices 1730, 1740, 1750. The image capture devices may capture still images (e.g., using device 1730), or video images (e.g., using device 1750). The embodiment of FIG. 17 allows customer 1720 to capture images using a single image capture device that is configured to simulate various other image capture devices.

Such simulation is typically accomplished by demonstrating what one or more images captured by one device would look like compared to the same image or images captured by a second device. Thus, the embodiment of FIG. 17 accurately demonstrates, for example, what a picture taken with a first camera 1730 would look like compared the same picture taken with a second camera 1740 by presenting the captured image using, e.g., a display 1710 or printer 1715. In some embodiments, a single "reference" image capture device is used to simulate multiple other image capture devices in this manner.

Typically, images captured by the simulating device are presented to a user using a display 1710 or printer 1715, where such presentations have the characteristics of the images, had they been captured by the simulated device. Other types of presentation devices include, by way of non-limiting example, televisions, computer monitors, organic displays, digital paper, flexible/foldable/roll-up, augmented reality equipment (e.g., glasses, goggles, helmets), active windows, active picture frames, "see-through" head-up (HUD) displays.

In general terms, the embodiment of FIG. 17 includes an image capture device that is configured to simulate the properties of a different product as perceived by an appropriate observer, such as a human, animal, or electronic sensor. In some embodiments, the simulation may incorporate all five human senses into the simulation strategy.

In some embodiments of the present invention, the image capture devices may be replaced by devices that present images that have been previously captured, such as DVD players. Thus, for example, customers may compare two DVD players by displaying their outputs on the same display device.

There are at least three factors that differentiate camera/ camcorders (hereinafter, "cameras," where a distinction is not important) from one another. First, the field of view is typically different for each camera. Note that the picture size that a camera captures is typically less than the wide field of view of the human eye. Second, cameras typically exhibit small discernable color differences that are barely detectable to the eye, but can be quantified in the histograms. These differences are mostly small shifts in the red, green, blue histogram values of less than 15/255 or 5%. Third, cameras have different resolutions. By way of non-limiting example, many cameras have more than four megapixels. Most camcorder employ NTSC standards of 480 lines (effectively 760×480 pixel resolution). To effectively simulate cameras/camcorders, these three parameters may be accounted for as follows.

Data stored in cameras is typically in JPG format; data stored in camcorders is typically in MPEG format. Extraction of the pictures/single frames from movies can be easily performed with these digital formats. Thus, camcorder simulation may in some embodiments be first performed using still images from the MPEG data.

Figure 18:
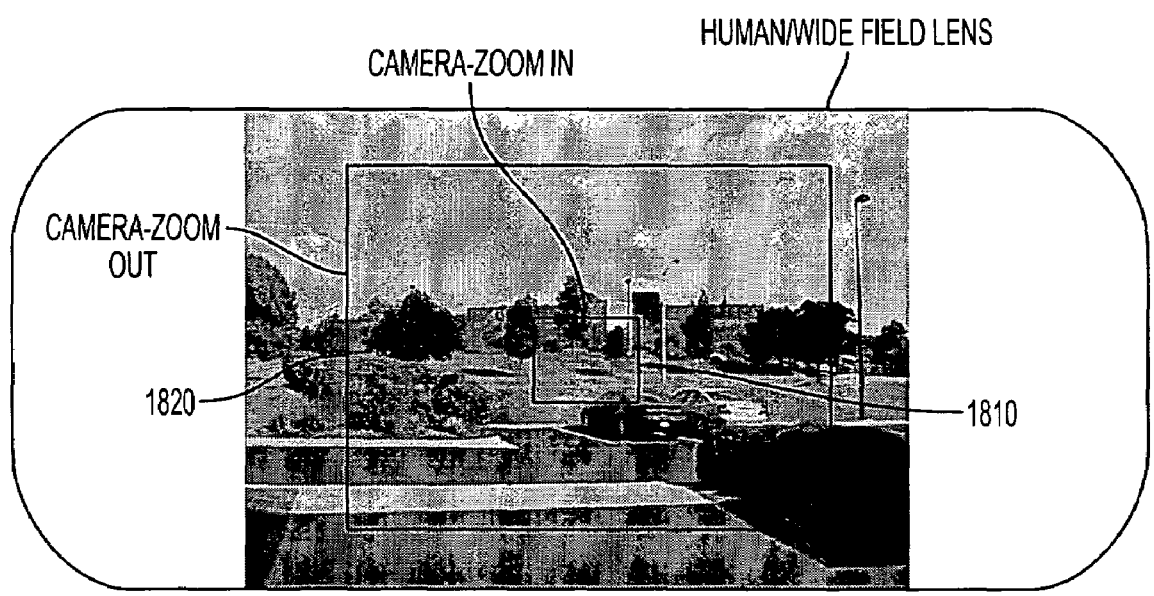
FIG. 18 illustrates a field of view simulation for an embodiment of the present invention.

FIG. 18 illustrates field-of-view simulation for an embodiment of the present invention. The unique field of view for each image capture device can be characterized and used to appropriately crop a reference image to demonstrate the product's field of view. In one embodiment, an image may be captured with a wide field lens on a high resolution camera. The same picture may be taken with the camera to be simulated at full zoom out 1820 and full zoom in 1810. Field of view differences (among different zoom settings and for normal status) between cameras may also be illustrated using outline boxes similar to those shown in FIG. 18. Further, images may be interactively displayed to the user to simulate any zoom setting in between the zoom in and zoom out extremes.

Resolution simulation for cameras may be accomplished using the up-sample and down-sample techniques discussed above regarding displays. An effective demonstration preferably includes a higher number of pixels, which allows larger "blowup" prints. Such a blowup can be effectively demonstrated by allowing dynamic zoom of the image. That is, resolution quality may be demonstrated by allowing a user to zoom in until the image is grainy and no longer judged to be good quality. Another possibility is to display the maximum dimension for a "good quality" image, where an objective or subjective standard is employed to gauge "good quality."

Color simulation may be performed as follows. According to certain embodiments of the present invention, a technique for simulating color differences includes shifting a color histogram. Another such technique shifts some of the pixels in a histogram bin, based on statistics to better re-create the original histogram. Alternately, a constant shift can be applied. Color may be shifted and matched according to the tolerance of human perception or according to scientific measurements. That is, embodiments of the present invention may include either or both of analytic/empirical color shifting and matching and psycho-optical color shifting and matching. The color simulation techniques taught herein above in relation to FIGS. 1-18 may also be used in certain image capture simulation embodiments of the present invention.

Figure 19:
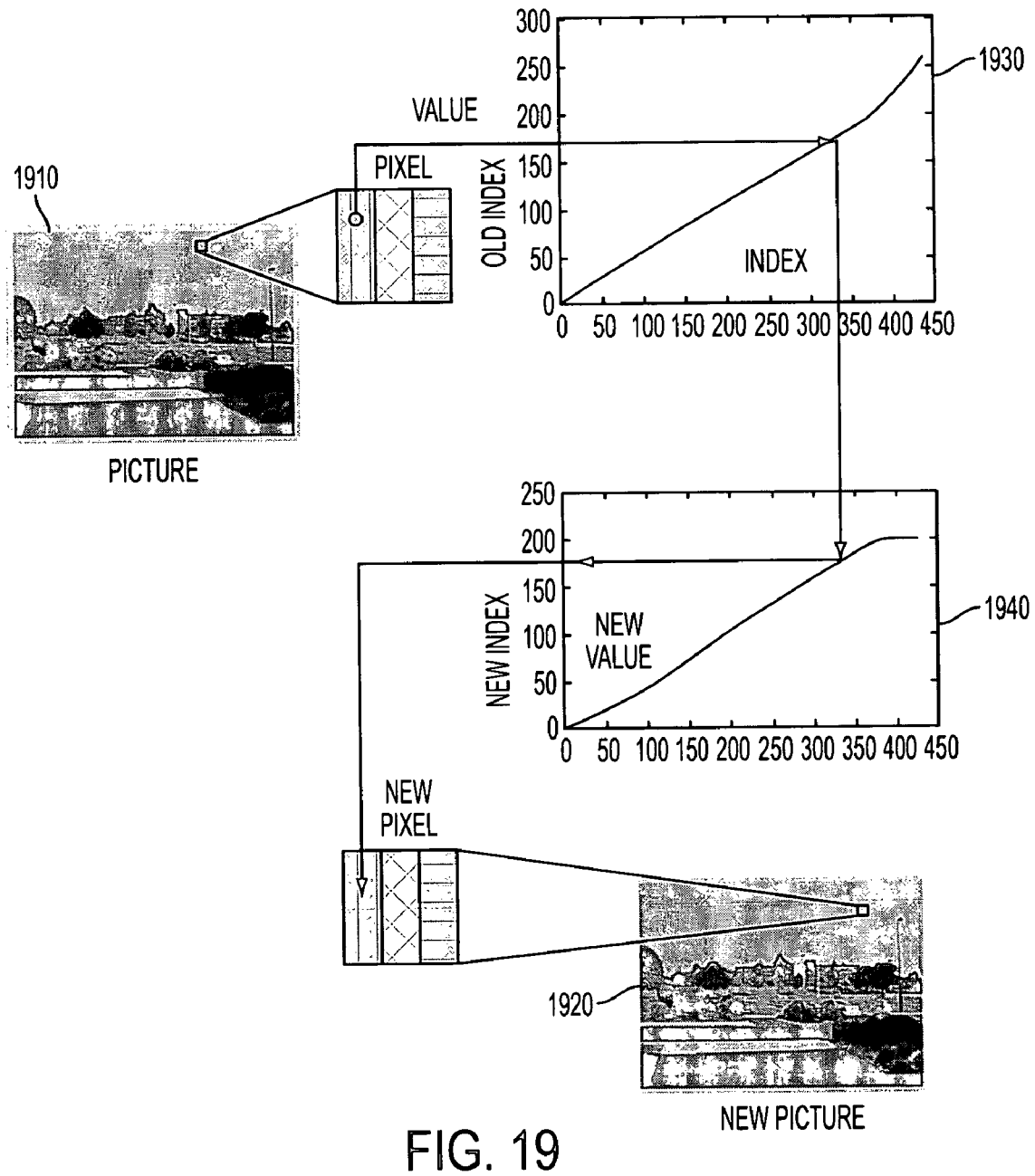
FIG. 19 is a schematic illustration of a color simulation technique according to an embodiment of the present invention.

FIG. 19 is a schematic illustration of a color simulation technique according to an embodiment of the present invention. Pictures 1910, 1920 are taken with camera A and camera B, respectively, of the same scene, which is preferably static to allow changing of the cameras on the tripod. The red, green, and blue histograms 1930, 1940 are calculated for each picture 1910, 1920, respectively. A histogram algorithm is now applied to the red, green, and blue histograms 1940 of the picture 1920 from camera B to make them match the histograms 1930 of the picture 1910 taken by camera A. The output of the algorithm is an input-output relationship of the pixels, i.e., the new index, the old index, and the percent of pixels to shift. The image is processed pixel by pixel; for each pixel the red, green, and blue pixel values are shifted to their new values. The picture is then reconstructed from these new red, green, blue pixel values. For general information on histogram-related algorithms, see, for example, Steven W. Smith *A Scientist and Engineer's Guide to Digital Signal Processing*, California Technical Publishing. San Diego, Calif., 1998 (wwwdotDSPguidedotcom), Faith Porikli, *Inter-Camera Color Calibration by Correlation Model Function*, TR-2003-103, February 2004 (wwwdotmerldotcom), and Faith Porikli, *Sensitivity Characteristics of Cross-Correlation Distance Metric and Model Function*, TR-2003-146, March 2004 (wwwdotmerldotcom), known to those of ordinary skill in the art and incorporated by reference herein in their entireties.

Figure 20:
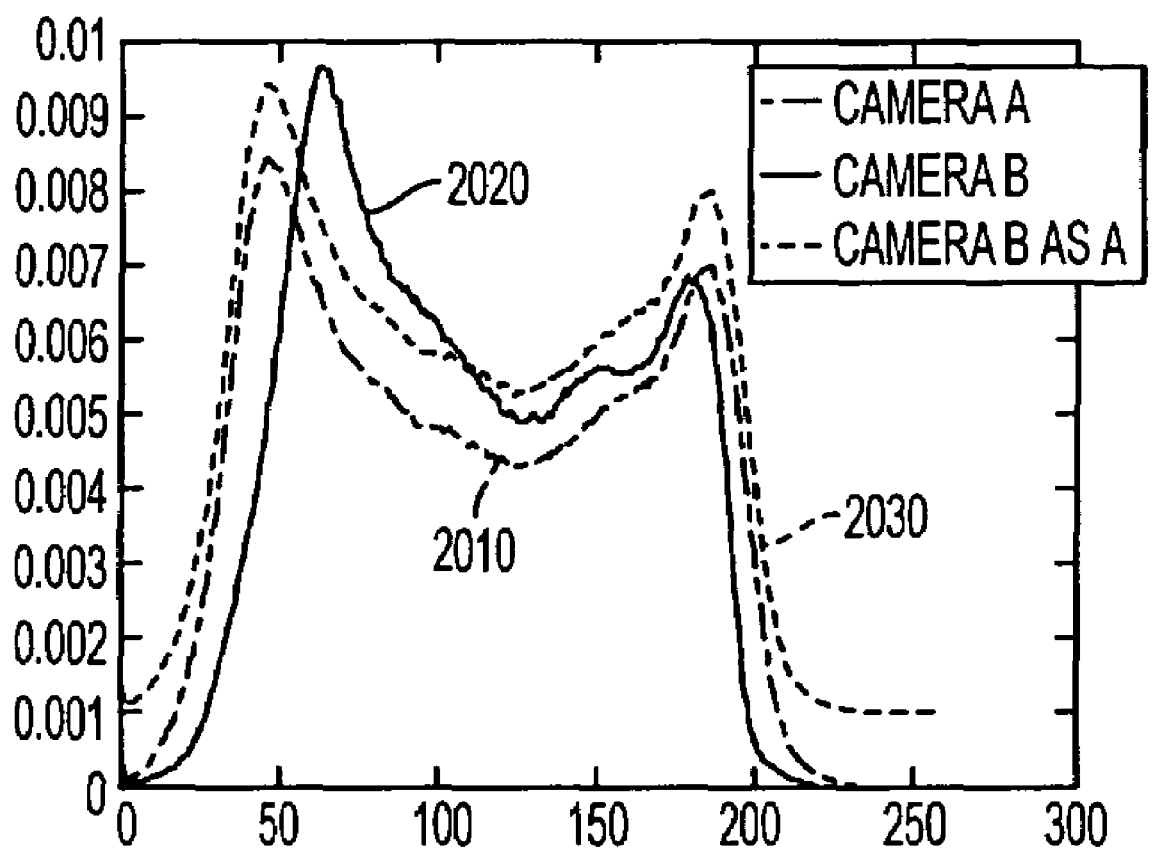
FIG. 20 presents representative results of a color-histogram-shifting algorithm according to an embodiment of the present invention.

FIG. 20 presents representative results of a color-histogram-shifting algorithm according to an embodiment of the present invention. This algorithm shifts a percentage of the histogram bin values to make the A and B histograms (the histograms for pictures taken by cameras A and B, respectively) match almost exactly. That is, this algorithm statistically shifts a percentage of the pixels in a histogram bin, as opposed to shifting the entire bin to another bin. Starting at the highest pixel value (255), the algorithm steps through the histogram array, matching histogram bin B to histogram bin A. If the number of pixels in a particular bin $\beta$ for B is greater than the number of pixels in a corresponding bin for A, the algorithm will remove (B–A) pixels to bin $\beta$–1. This will create the old index $\beta$, the new index, $\beta$–1 and the percentage (B–A)/B. This process is repeated with the new array starting at $\beta$–1 until it reaches $\beta$=0. FIG. 18 illustrates the shift results for red pixels. The Y-axis represents normalized histogram value (the number of pixels in each bin/total number of pixels). The X-axis represents pixel value (0 to 255). Curve 2010 represents camera A, curve 2020 represents camera B, and curve 2030 represents camera B simulating camera A. Note that, for purposes of illustration, curve 2030 has been purposefully offset by 0.001 since it lies exactly on curve 2010.

An alternate histogram-shifting algorithm may be used in certain embodiments of the present invention. Using the two histogram values, this algorithm calculates an error based upon the differences in the histograms. The histograms are then shifted by whole numbers in the positive and negative direction while the error is calculated. The best fit is then the shift that results in the lowest error. This process is applied to the red, green, blue histograms. The input-output relationship may be expressed as: (old index)–shift=(new index).

Figure 21:
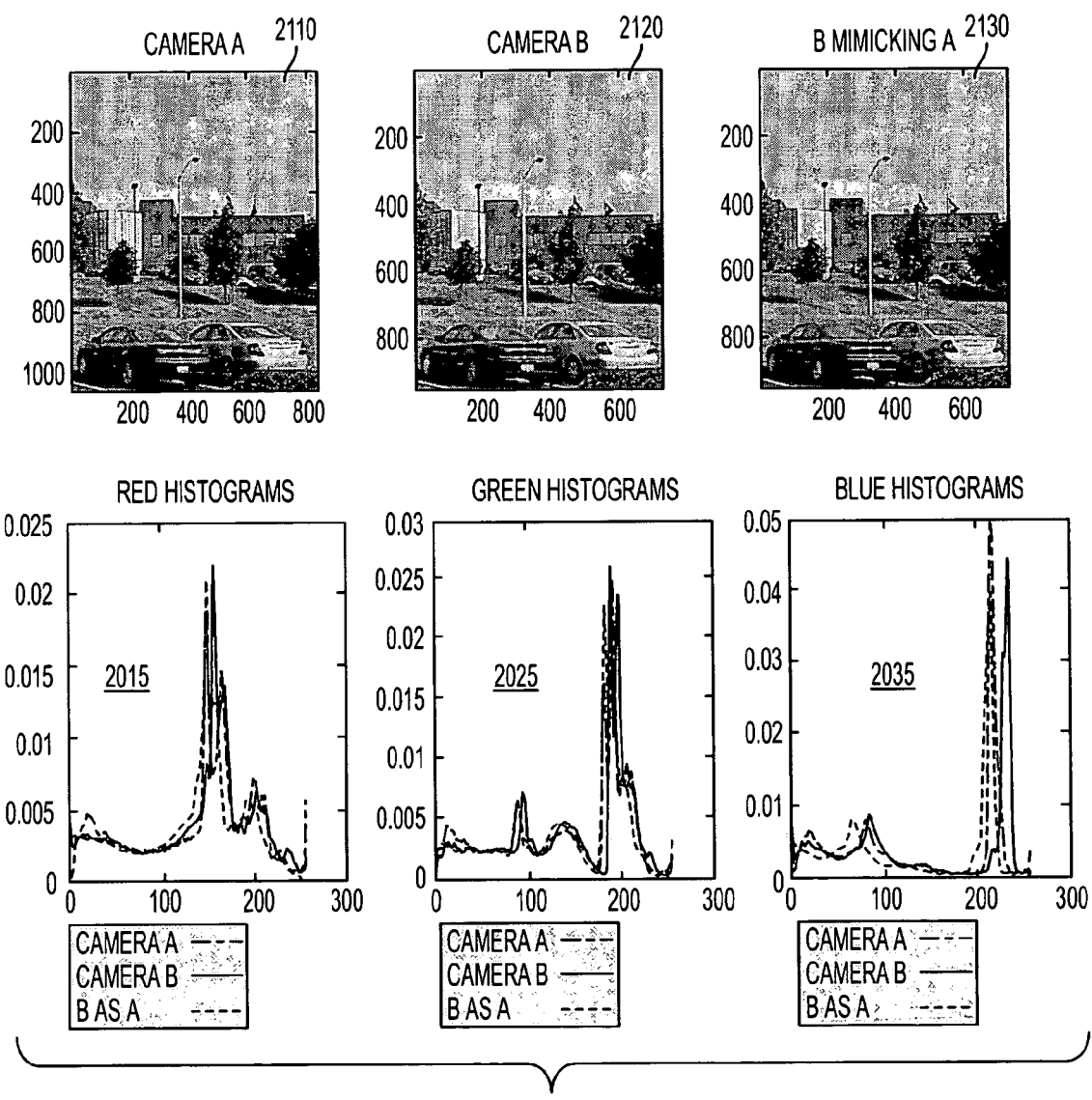
FIG. 21 illustrates a histogram-shifting algorithm according to an embodiment of the present invention.

FIG. 21 illustrates a histogram-shifting algorithm according to an embodiment of the present invention. FIG. 21 shows three pictures: a first picture 2110 taken by camera A, a second picture 2120 taken by camera B, and simulation picture 2030 where camera B simulates camera A. The red histogram 2115, green histogram 2125, and blue histogram 2135 are presented in the lower three graphs. Each graph 2115, 2125, 2135 compares the histogram for each primary color. As can be seen, the peak values of the red, green, and blue histograms are at higher color values for camera B compared to camera A. Using the second algorithm, the histogram-shift values were determined to be 9, 6, and 18 for red, green, and blue, respectively. As can be seen, all three simulation histograms are more closely aligned with camera A histograms, producing a better color-matched picture.

In certain embodiments of the present invention, color simulation may be accomplished by way of color management techniques. Such techniques provide a way to take the values that represent a desired color on one device, and from them produce corresponding values that reproduce the same color on another device. Color profiles, such as the International Color Consortium's color profiles, may be used to this effect. Information for implementing such techniques is available at www.color.org.

Image capture devices other than cameras and camcorders may be simulated according to embodiments of the present invention. By way of non-limiting example, scanning devices may be simulated. Such scanning devices include, by way of non-limiting example, computer scanners (desktop/business/professional/etc.), fax machines, (photo)copy machines, and mimeograph or other technologies that use discrete sensing elements to produce an alternate (digital or otherwise) representation of the scanned information.

Color accuracy capabilities of scanning devices may be simulated according to the techniques taught herein. Thus, a reference scanning device with a broad color range may be used to demonstrate the color accuracy of a scanning device with a more limited color range. An image could be scanned by a reference scanning device and digitally processed to accurately simulate the color content that would be acquired by a more color limited scanning device.

Resolution is another scanning device parameter that may be simulated. Thus, a reference scanning device may be used to simulate the resolution of a target scanning device. Further, a reference scanning device may be used to simulate the physical characteristics (e.g., size, shape, spatial density, orientation) of a target scanning device's sensing elements. An image could be captured digitally by the reference scanner and digitally or otherwise processed to simulate the image that a target scanner would acquire.

Certain embodiments of the present invention employ techniques described herein to specifically match a display device with an image capture device. Such matching preferably optimizes the performance of both devices so as to model the captured image as closely as possible in the display device. Knowing the output capabilities of the anticipated display device for a captured image/video feed allows certain capabilities, such as A/D dynamic range settings or exposure time, to be optimized for that display device.

Certain embodiments of the present invention employ a general standard, which concatenates a wide variety of scientific measurements and performance metrics. Performance metrics that form part of the general standard may include, by way of non-limiting example, brightness, color, resolution, size, and speed of appearance change. Such a general standard allows all products marketed in a given retail environment (whether brick-and-mortar, electronic, or other) to be benchmarked and rated. At present, there exists a need in the consumer display market for a universal standard that provides for unbiased comparison amongst competing products and technologies.

Certain embodiments of the present invention include customer education expedients, which may be present in or near, e.g., product demonstration area 100 of FIG. 1 or product demonstration area 1700 of FIG. 17. Such expedients serve to educate the consumer about features of current audio/visual products relevant to selecting a suitable product to meet their specific needs. Short animations (e.g., MACROMEDIA FLASH) may be used to educate customers on the important features to consider when choosing an audio or video product. These short multi-media presentations could quickly convey concepts such as sound formats (e.g., stereo, surround, DOLBY 5.1). Other topics for consumer education (via, e.g., short animation) include, by way of non-limiting example: physical product inspection, screen size, resolution, brightness, contrast ratio, color range/depth, aspect ratio (and conversions), viewing angle, pixel characteristics, glossiness of display surface, broadcast resolution standards (e.g., SD, ED, HD), ambient light effects, on-screen menus, input signal noise, and color engine differences and precision (e.g., 8-bit or 12-bit). Some of the animations may convey conceptual information such as contrast ratio and aspect ratio, while others could use scientifically measured data such as resolution, viewing angle light output, and pixel size/shape/orientation. Such animations may also be present on a web page for access outside of the particular store. Retail employees who are familiar with sources of consumer misunderstanding may be consulted for additional education topics.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A system for evaluating characteristics of multiple image capture devices in a retail environment, the system comprising:
   a first image capture device accessible to a customer;
   a user interface configured to accept a user input;
   a stored collection of parameters associated with a plurality of image capture devices;
   a purchase point whereby at least one of the plurality of image capture devices may be purchased; and
   a processor configured to access at least one of the stored parameters in response to the user input;
   whereby the first image capture device is configured to simulate at least one of the plurality of image capture devices consistent with the user input.

2. The system of claim 1 further comprising a display configured to display an image captured by the first image capture device in accordance with the simulation of the at least one of the plurality of image capture devices.

3. The system of claim 2 wherein the display is selected from the group consisting of: television screen, computer monitor, organic display, digital paper, flexible display, foldable display, roll-up display, glasses, goggles, helmet, active windows, active picture frame, head-up display, embedded display, and printer.

4. The system of claim 1 wherein the first image capture device is selected from the group consisting of: camera, camcorder, scanner, fax machine, copy machine, biological imaging device, and mimeograph.

5. The system of claim 1 wherein at least one of the plurality of image capture devices is selected from the group consisting of: camera, camcorder, scanner, fax machine, copy machine, biological imaging device, and mimeograph.

6. The system of claim 1 wherein the stored collection of parameters includes parameters relating to resolution, and the first image capture device is configured to simulate a resolution of at least one of the plurality of image capture devices.

7. The system of claim 1 wherein the stored collection of parameters includes parameters relating to color, and the first image capture device is configured to simulate a color captured by at least one of the plurality of image capture devices.

8. The system of claim 7 further configured to alter a color histogram.

9. The system of claim 7 further comprising color profile means.

10. The system of claim 1 wherein at least one of the stored parameters is empirically determined.

11. The system of claim 1 wherein the collection of stored parameters comprise data selected from the group consisting of: height, width, resolution, contrast ratio, brightness, color range, aspect ratio, pixel size, pixel shape, pixel composition, pixel orientation, field of view, user interface, interactivity, spatial density, bandwidth, connectivity, and input type.

12. A method of simulating a plurality of image capture devices for evaluation in a retail environment, the method comprising:
providing a first image capture device;
accepting an input at a user interface;
accessing, from a stored collection of parameters associated with a plurality of image capture devices, a stored parameter associated with a second image capture device;
simulating the second image capture device using the first image capture device and
consistent with the user input; and
offering at least one of the plurality of image capture devices for sale.

13. The method of claim 12 further comprising displaying an image captured by the first image capture device in accordance with the step of simulating.

14. The method of claim 13 wherein the step of displaying comprises displaying on a device selected from the group consisting of: television screen, computer monitor, organic display, digital paper, flexible display, foldable display, roll-up display, glasses, goggles, helmet, active windows, active picture frame, head-up display, embedded display, and printer.

15. The method of claim 12 wherein the first image capture device is selected from the group consisting of: camera, camcorder, scanner, fax machine, copy machine, biological imaging device, and mimeograph.

16. The method of claim 12 wherein at least one of the plurality of image capture devices is selected from the group consisting of: camera, camcorder, scanner, fax machine, copy machine, biological imaging device, and mimeograph.

17. The method of claim 12 wherein the stored collection of parameters includes parameters relating to resolution, and the step of simulating comprises simulating a resolution of at least one of the plurality of image capture devices.

18. The method of claim 12 wherein the stored collection of parameters includes parameters relating to color, and the step of simulating comprises simulating a color captured by at least one of the plurality of image capture devices.

19. The method of claim 18 further comprising altering a color histogram.

20. The method of claim 18 further comprising using color profiles.

21. The method of claim 12 further comprising empirically determining at least one of the stored parameters.

22. The method of claim 12 wherein the collection of stored parameters comprise data selected from the group consisting of: height, width, resolution, contrast ratio, brightness, color range, aspect ratio, pixel size, pixel shape, pixel composition, pixel orientation, field of view, user interface, interactivity, spatial density, bandwidth, connectivity, and input type.

23. A system for evaluating characteristics of multiple image capture devices in a retail environment, the system comprising:
at least one image capture device accessible to a customer;
a user interface configured to accept a user input;
a stored collection of parameters associated with a plurality of image capture devices;
means for offering at least one of the plurality of image capture devices for sale; and means for simulating at least one of the plurality of image capture devices in response to the user input;
whereby the means for simulating is configured to access at least one of the stored parameters consistent with the user input.

24. The system of claim 23 further comprising means for displaying an image captured by the first image capture device in accordance with the simulation of the at least one of the plurality of image capture devices.

25. The system of claim 24 wherein the means for displaying is selected from the group consisting of: television screen, computer monitor, organic display, digital paper, flexible display, foldable display, roll-up display, glasses, goggles, helmet, active windows, active picture frame, head-up display, embedded display, and printer.

26. The system of claim 23 wherein the first image capture device is selected from the group consisting of: camera, camcorder, scanner, fax machine, copy machine, biological imaging device, and mimeograph.

27. The system of claim 23 wherein at least one of the plurality of image capture devices is selected from the group consisting of: camera, camcorder, scanner, fax machine, copy machine, biological imaging device, and mimeograph.

28. The system of claim 23 further comprising means for simulating a resolution of at least one of the plurality of image capture devices, wherein the stored collection of parameters includes parameters relating to resolution.

29. The system of claim 23 further comprising means for simulating a color captured by at least one of the plurality of image capture devices, wherein the stored collection of parameters includes parameters relating to color.

30. The system of claim 29 wherein the means for simulating a color comprise means for altering a color histogram.

31. The system of claim 29 wherein the means for simulating a color comprise color profile means.

32. The system of claim 23 wherein at least one of the stored parameters is empirically determined.

33. The system of claim 23 wherein the collection of stored parameters comprise data selected from the group consisting of: height, width, resolution, contrast ratio, brightness, color range, aspect ratio, pixel size, pixel shape, pixel composition, pixel orientation, field of view, user interface, interactivity, spatial density, bandwidth, connectivity, and input type.

* * * * *